(12) United States Patent
Mucerino, Jr. et al.

(10) Patent No.: US 8,448,608 B2
(45) Date of Patent: May 28, 2013

(54) TETHERING DEVICE WITH FORCE-DISPLACEMENT SYSTEM

(75) Inventors: Frank L. Mucerino, Jr., Dickson, TN (US); Laura Mucerino, Dickson, TN (US); Van T. Walworth, Lebanon, TN (US); David B. Hook, Franklin, TN (US)

(73) Assignee: Dreamcatcher Patent and Product Development, LLC, Dickson, TN (US)

( * ) Notice: Subject to any disclaimer, the term of this patent is extended or adjusted under 35 U.S.C. 154(b) by 274 days.

(21) Appl. No.: 12/825,694

(22) Filed: Jun. 29, 2010

(65) Prior Publication Data

US 2011/0000440 A1  Jan. 6, 2011

Related U.S. Application Data

(60) Provisional application No. 61/269,998, filed on Jul. 2, 2009, provisional application No. 61/335,330, filed on Jan. 5, 2010.

(51) Int. Cl.
*A01K 27/00* (2006.01)

(52) U.S. Cl.
USPC .......................................................... 119/797

(58) Field of Classification Search
USPC ................. 119/707, 709, 769, 782, 792–793, 119/798, 791; 441/23–25
See application file for complete search history.

(56) References Cited

U.S. PATENT DOCUMENTS

| | | | | |
|---|---|---|---|---|
| 843,543 A * | 2/1907 | Matsumoto | | 119/769 |
| 1,647,790 A * | 11/1927 | Fulton | | 267/74 |
| 2,194,736 A * | 3/1940 | Curran | | 119/709 |
| 2,698,598 A * | 1/1955 | Hadley | | 119/708 |
| 2,911,947 A * | 11/1959 | Kramer | | 119/798 |
| 3,018,494 A * | 1/1962 | Guido | | 441/84 |
| 3,662,539 A * | 5/1972 | Florjancic | | 59/80 |
| 3,731,925 A * | 5/1973 | Caldwell | | 473/424 |
| 4,309,954 A * | 1/1982 | Szuch | | 114/230.24 |
| 4,529,388 A * | 7/1985 | Jones et al. | | 441/3 |
| 4,597,351 A * | 7/1986 | Brainard, II | | 267/74 |
| 4,681,303 A * | 7/1987 | Grassano | | 267/113 |
| 5,146,876 A * | 9/1992 | McPhail | | 119/798 |
| 5,873,328 A * | 2/1999 | Campbell | | 119/798 |
| 6,053,129 A | 4/2000 | Akre | | |
| D438,090 S * | 2/2001 | Friedman | | D8/349 |
| 6,935,277 B2 * | 8/2005 | Vaccari | | 119/796 |
| 7,293,531 B2 * | 11/2007 | Young, III | | 119/798 |
| 7,530,334 B1 * | 5/2009 | Napolitano | | 119/798 |
| 2008/0216769 A1 * | 9/2008 | LaCross | | 119/798 |
| 2010/0018474 A1 * | 1/2010 | Noonan | | 119/792 |

* cited by examiner

*Primary Examiner* — Kimberly Berona
*Assistant Examiner* — Ebony Evans
(74) *Attorney, Agent, or Firm* — Harness, Dickey & Pierce, P.L.C.

(57) ABSTRACT

A tether device includes a tether assembly disposed between two entities maintaining connection between the entities. A resilient element is integrated with the tether assembly. A geometry of the tether assembly and the resilient element create first and second resilient element and tether force-displacement responses when the resilient element and tether assembly are together subjected to at least first and second axial displacement forces. The second axial displacement force is greater than the first axial displacement force. The first force-displacement response, when subjected to the first axial displacement force, is greater than the second force-displacement response when subjected to the second axial displacement force. The geometry can include a tether configured in a serpentine formation in a relaxed position. The serpentine formation straightens taut when the tether is fully extended by the second axial displacement force. The geometry can also include multiple O-rings.

45 Claims, 36 Drawing Sheets

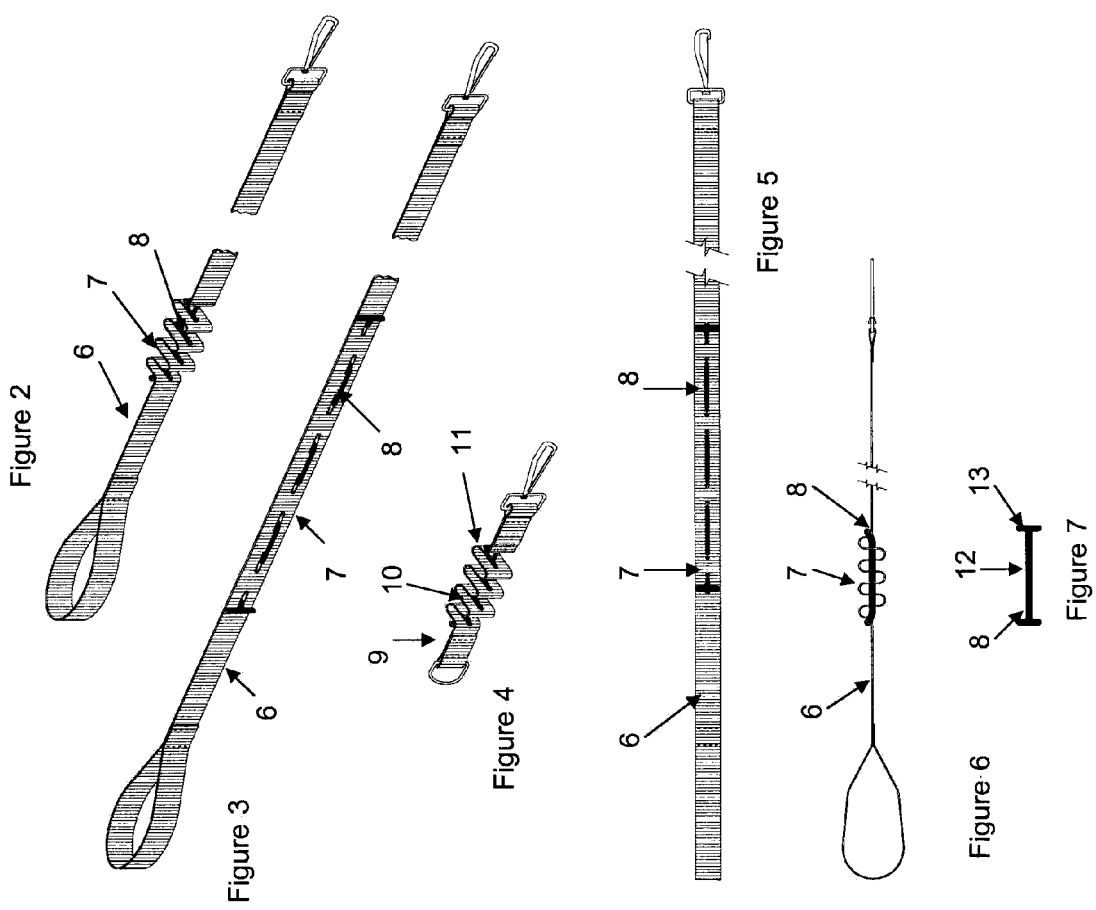

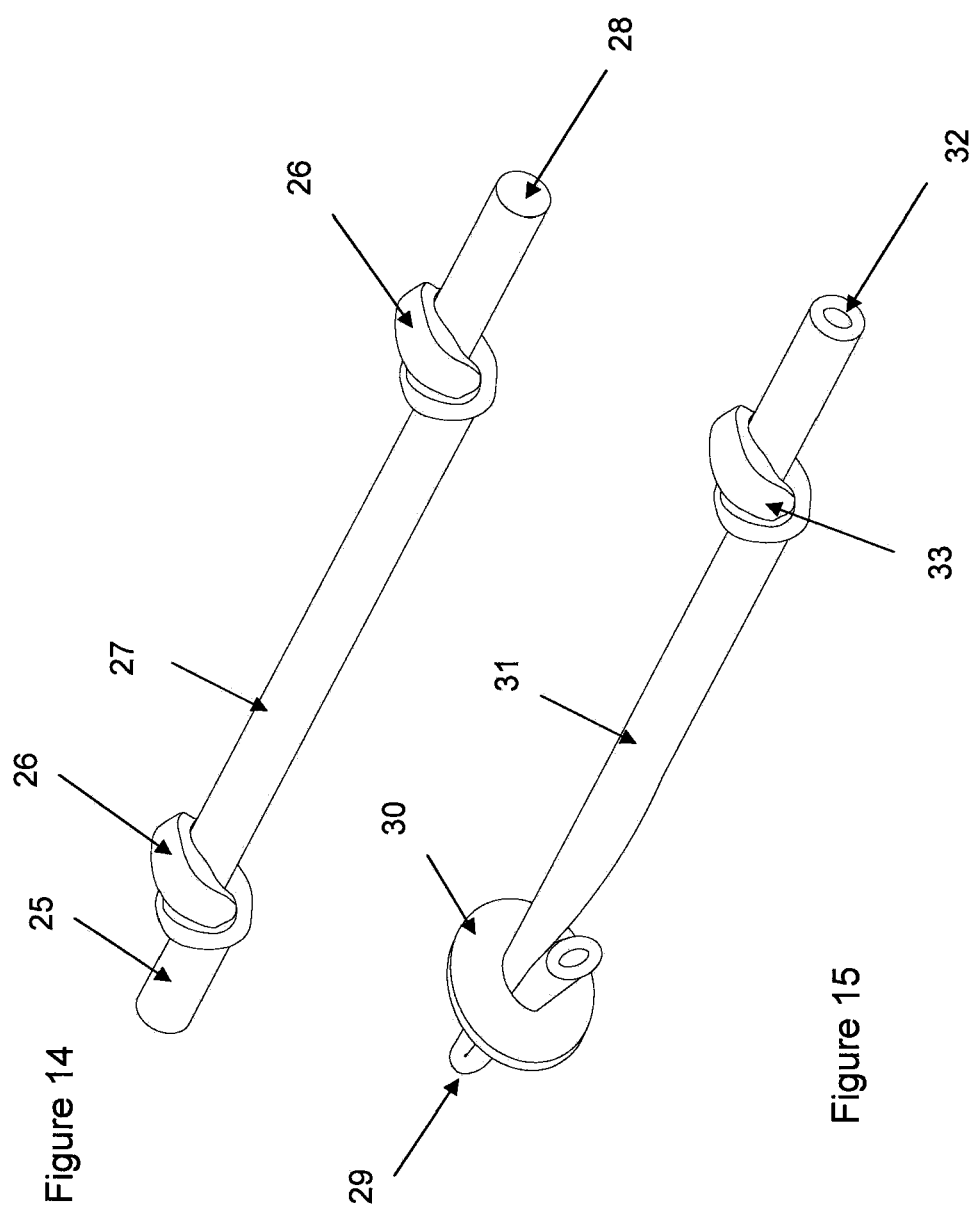

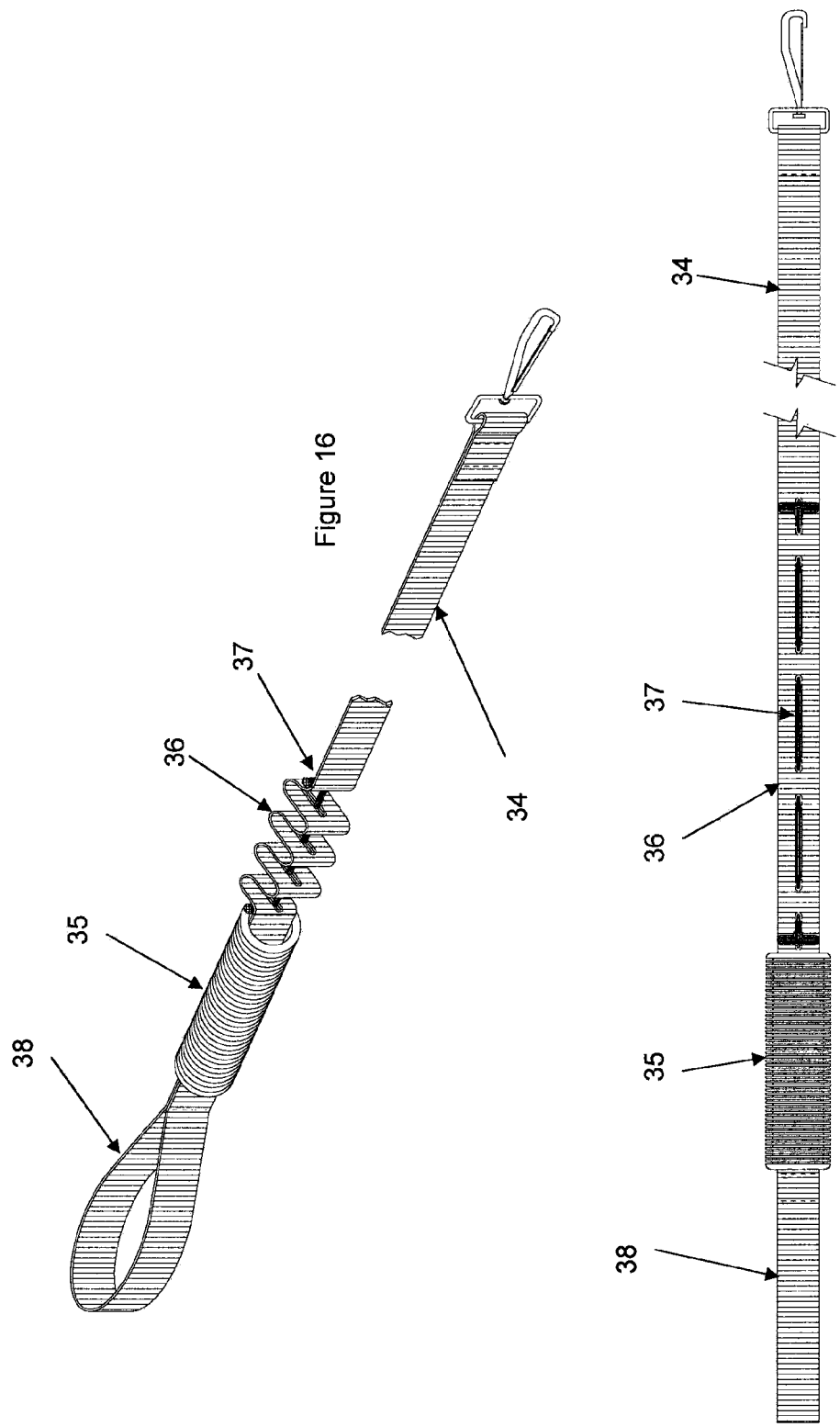

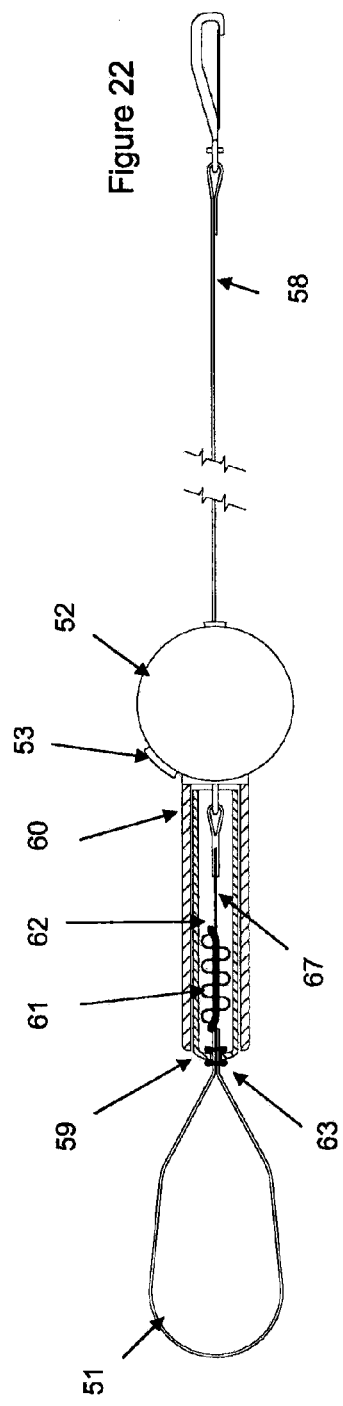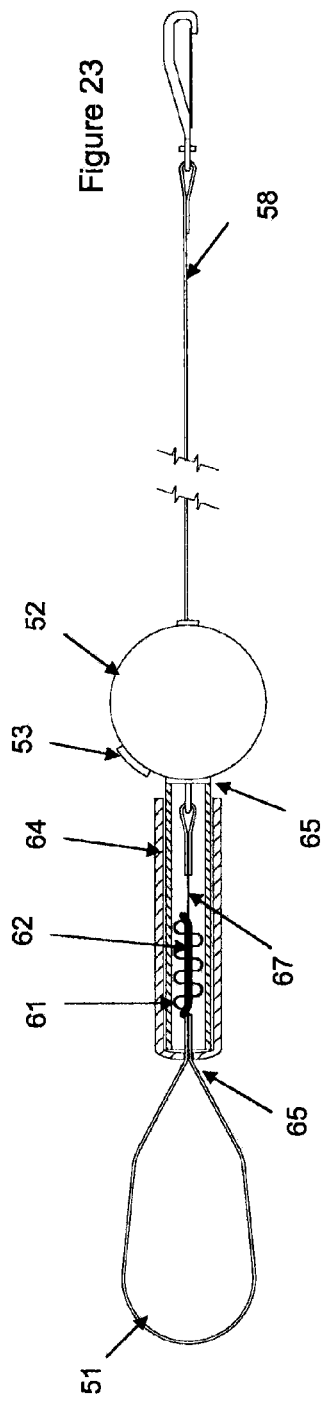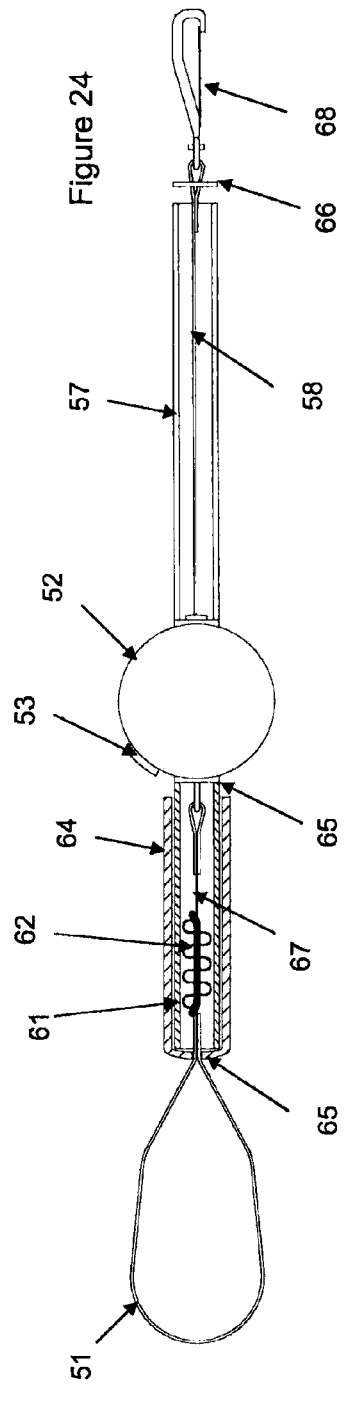

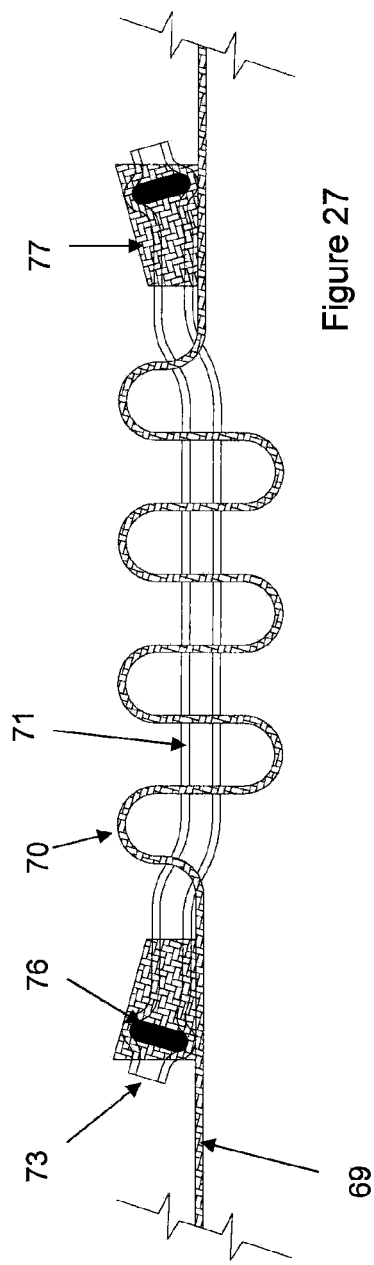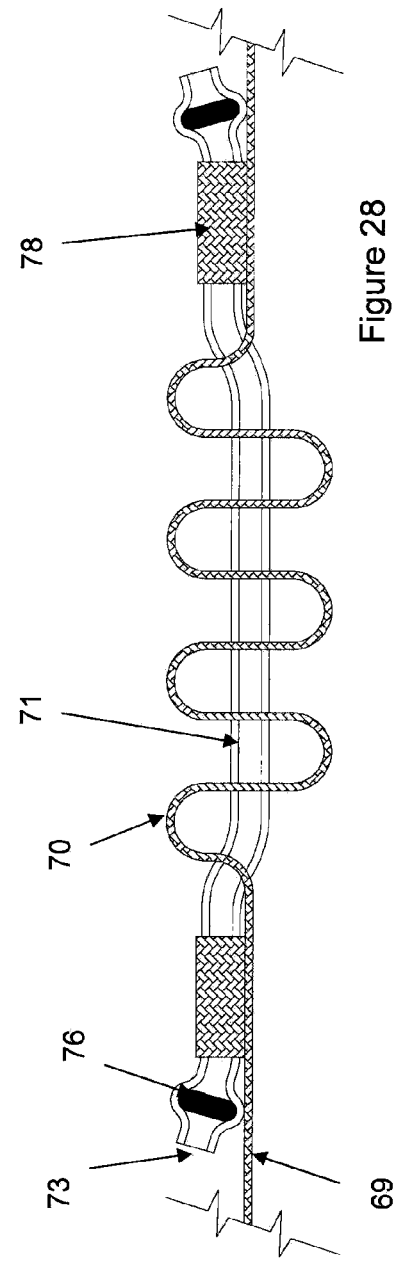

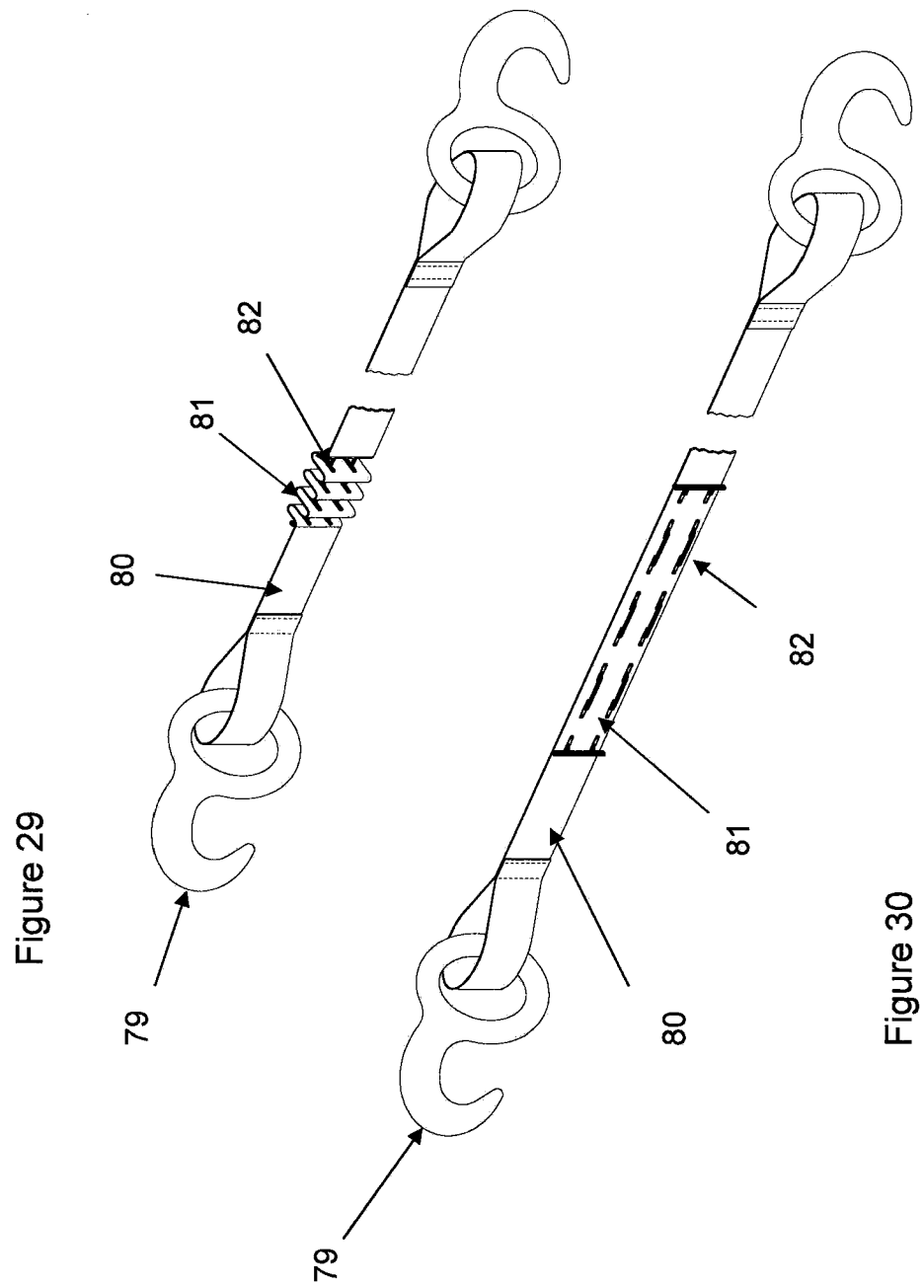

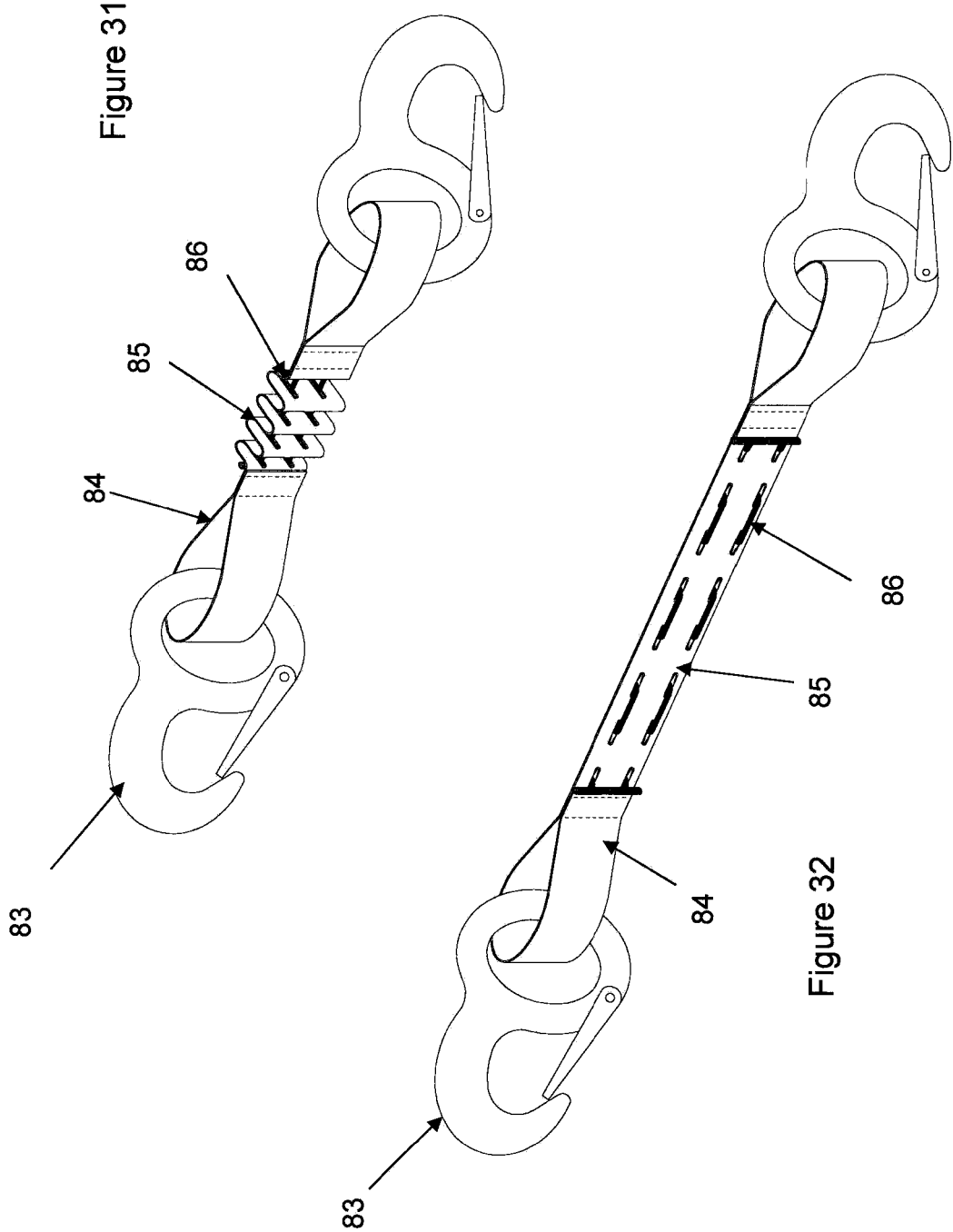

Figure 33
Figure 34
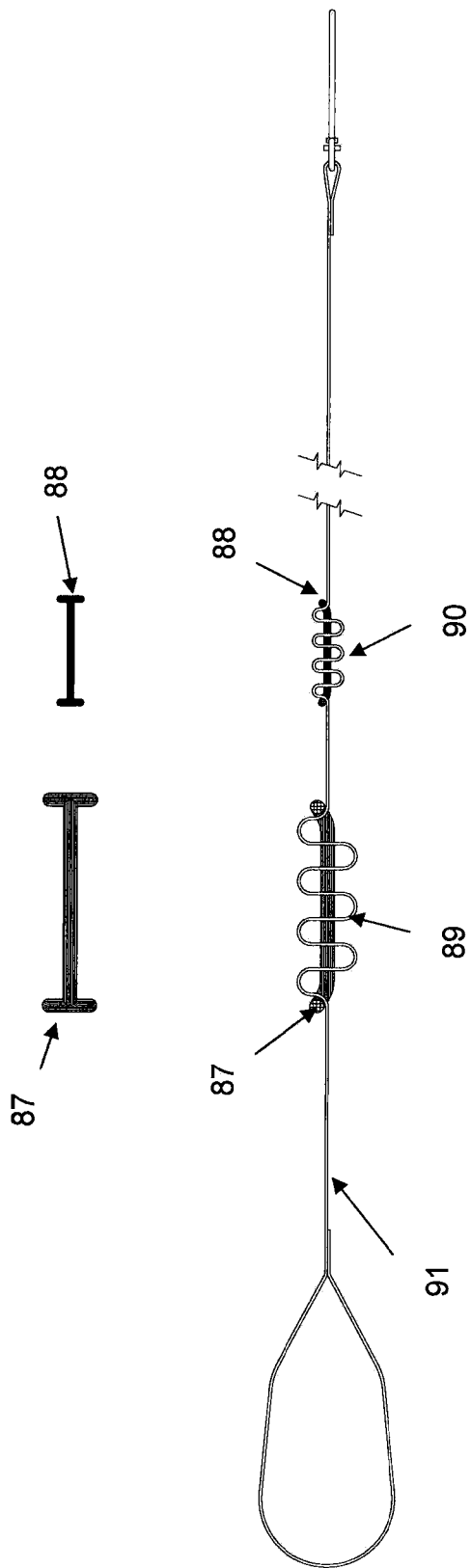
Figure 35

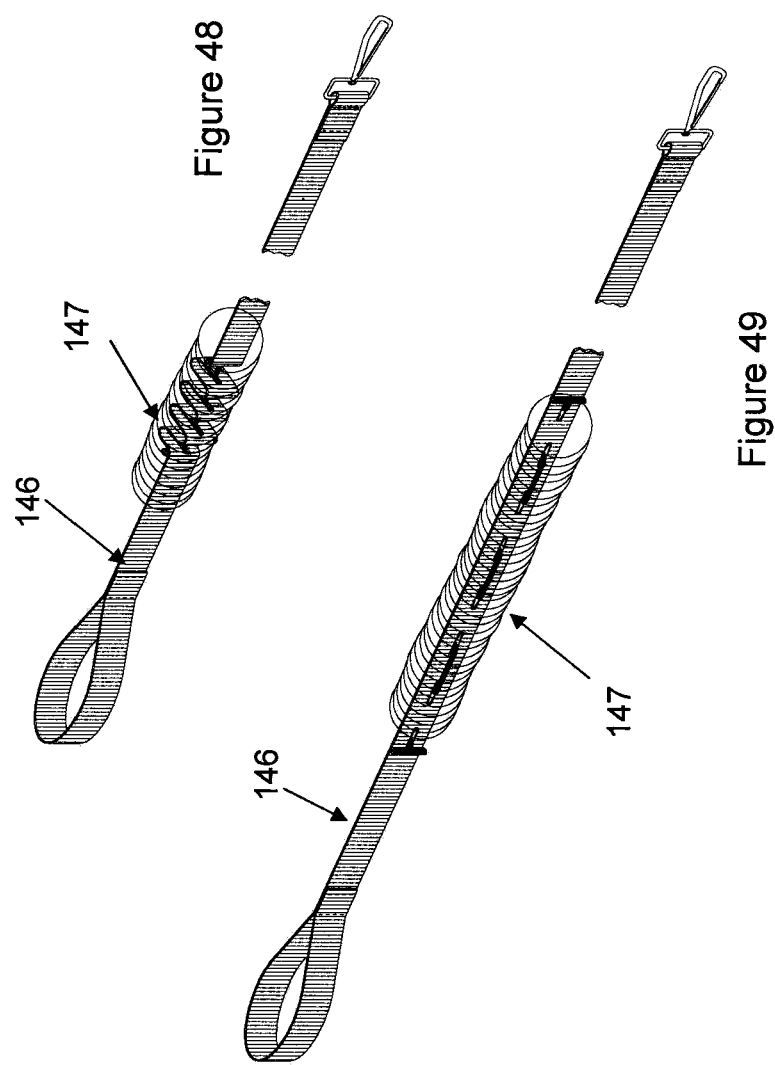

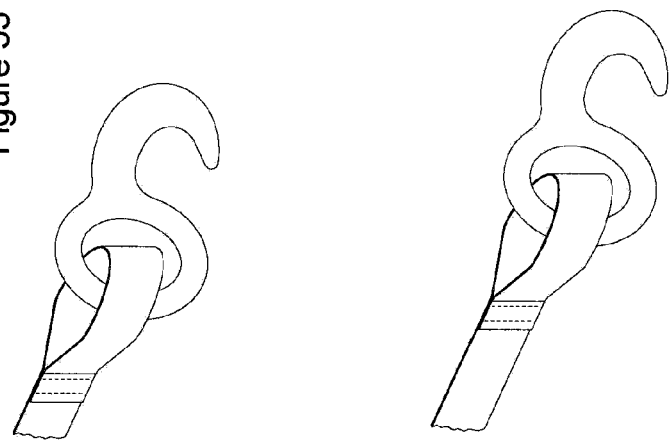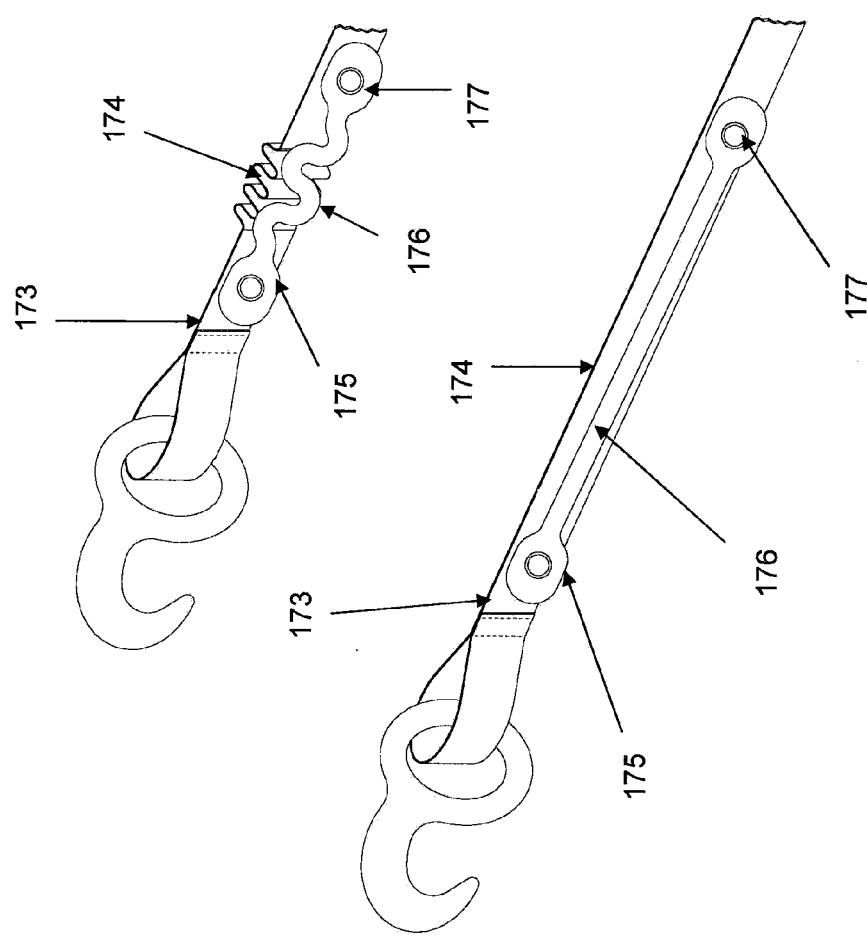

Chart 1
Force-Displacement
Typical Single-Zone Linear Relationship

Chart 2
Force-Displacement
Multiple-Zone & Transitional Relationship

TETHERING DEVICE WITH FORCE-DISPLACEMENT SYSTEM

CROSS-REFERENCE TO RELATED APPLICATIONS

This application claims the benefit of U.S. Provisional Application No. 61/269,998, filed on Jul. 2, 2009, and U.S. Provisional Application No. 61/335,330, filed on Jan. 5, 2010. The entire disclosures of each of the above applications are incorporated herein by reference.

FIELD

The subject invention is related to tethering connection devices such as those used for animal leashes, vehicle towing devices, and safety harness devices used to prevent falling injuries, sports applications such as water skiing, exercise equipment, and/or similar restraint applications utilizing a flexible connection device disposed between two entities.

BACKGROUND

This section provides background information related to the present disclosure which is not necessarily prior art.

There are many needs and uses in the world in which a tether or leash or some kind of attachment means is used to flexibly connect two entities together. Some flexible attachment methods are quite common and readily recognized in widespread use such as a dog leash. Another application, not in wide spread use is a tow strap between two vehicles. Still another application even less well known by the general population is a safety harness to prevent falls from elevated positions.

Traditional leashes and tethers and other similar applications all suffer from a common problem, and that is at the moment the tether becomes taut due to the two entities at opposing ends of the tether moving apart the tether abruptly restricts relative movement of one or both entities. This abrupt restriction to movement can cause injury, hard jerks, personal discomfort, loss of balance, and/or damage to the tether.

The applications and uses of tether type devices and systems are expanding for everyday life activities, work environments, sporting activities, and leisure activities. There is a great need for an improved tether type device that imposes restrictive movement between two entities and yet prevents destructive forces acting upon either the tether and/or the entities connected to the tether device.

In applications where animals are tethered by a human for the purposes of recreation and/or training and/or restraint, it is a common place scenario when the animal jerks or lunges in such fashion as to cause the tether device to become taut causing injury to the person and/or the animal. In addition, sudden lunging scenarios with the animal and tether device can cause the tether device to fail in response to the huge potential impact forces that can be generated by an animal's actions. Such a failure in the tether device often results in the animal getting loose presenting a danger to itself and/or others nearby.

There are a number of references trying to address this problem in selected applications, however, the prior examples fall short of satisfactorily resolving the issues at hand and usually at best are very limited in their application.

In the sport of water skiing devices such as U.S. Pat. No. 6,119,617 reveal a stand pipe fixed to a boat which includes a spring system housed inside to give the ski rope a spring give-feel to the skier. One problem with this type of device is that it is hard mounted to the boat and offers no flexibility for alternate applications. Another problem with this device is that the spring element is oriented essentially transverse to the direction of pull of the ski rope which inhibits and/or minimizes sensitivity and response time for the skier trying to remain upright and balanced. Another problem is that spring devices have a relatively constant spring rate which is not adjustable or tunable to the users needs for different spring rates during use of the product.

In the sport of surfing, United States Patent Application Publication 2006/0141879-A1 presents a leash device connecting a surf board to the user designed to prevent being tangled. One problem with this design is that the proposed weight increases drag in the water at a distant point of the leash and further adds a measure of mass increasing momentum whenever the user is separated from the surf board causing the inevitable taut jerk of the leash to be even more violent than it might have been otherwise.

U.S. Design Pat. D-571,059-S proposes a tube with a spring device housed inside. The spring housing assembly is designed to be connected between a dog collar and a leash to absorb shock. One problem with this type of device is that the spring response time is very slow compared to the response time of a dog as it lunges suddenly such that the spring does not have time to absorb shock fast enough to prevent it being transferred through the assembly to the person. Another problem with this type of device is that the weight of the assembly next to the dog collar and its relative size is bulky and distractive to the animal. Another problem is that the device has a relatively constant spring rate and does not allow a means to adjust the spring rate of shock absorption for different scenarios.

United States Patent Application Publication 2009/0000568-A1 proposes a shock absorbing elastic element with loops on the ends to allow a normal known leash to be wound around the elastic element in a spiral candy cane like orientation. One problem with this device is that upon stretching the elastic element the leash spirals essentially unwind trying to return to a straight leash, which does absorb some shock—the first time. However, after being unwound substantially, the leash has little or no means to wind back up and it therefore remains in a somewhat unwound state rendering further shock absorbing capabilities dramatically impaired. Another problem with this device is that the leash spirals and twists around as the elastic element stretches and the leash unwinds, which causes the entire leash to become twisted like a swizzle stick. Because the leash does not wind itself back up, the leash remains in a twisted condition. Even if the connection of the leash ends includes a swivel joint the friction of the swivel components is greater than the force required to unwind the leash spiral around the elastic element and therefore based on principles of least force resistance the swivel joints act as though they are welded solid.

Very few additional devices exist in the market place to address this problem with any success in any of the fields of application for the subject invention. Therefore, the subject invention overcomes these shortcomings and addresses the needs of the consumer in various applications.

SUMMARY

This section provides a general summary of the disclosure, and is not a comprehensive disclosure of its full scope or all of its features.

One problem with prior tethering devices such as dog leashes is that the leash provides no means to absorb shock when the dog suddenly lunges. The reaction time of a dog is much faster than that of a person, and therefore the leash can become a taut leash before the person is ready and/or braced to resist or absorb the shock themselves. As a result, personal injury often occurs, especially when large dogs are involved. Various devices and patents trying to address this problem fail to account for the reaction time difference between the animal and the person rendering them ineffective. The subject invention addresses this problem by providing an application of the resilient device that does not have a constant spring rate; rather it provides a resilient device possessing multiple load force-displacement characteristics.

The subject invention provides a resilient device in which there is an initial light duty load response, that transitions into a medium duty load response, and that finally transitions into a heavy duty load response. The initial light duty load results in a force-displacement wherein relatively low force is required to displace a relatively long displacement distance. The final heavy duty load results in a relatively high force required to displace a relatively short displacement distance. A transition exists between them providing a relatively median force required displacing a relatively median displacement distance.

Tethering devices are commonly constructed from a wide variety of materials including, metal chains, metal cables, wire or cord type materials, rope type materials, and strap type materials. Many strap type materials include nylon, polyester, cotton, polyethylene, and many other fabric and/or fibrous materials. Regardless of the material the tethering device is constructed from, the features of the subject invention have applicable merit.

The resilient element of the subject invention can be constructed using any one of many resilient materials such as rubber, latex, elastic tubing, elastic cord, and manufactured using typical methods used by the respective industries from which those materials come. Those skilled in the art will appreciate that this list of construction materials is not exhaustive and that many additional materials with resilient like properties exist that could be fashioned to perform in such a way as to maintain the spirit of the subject invention.

In a dog leash application, the transition from light duty through medium duty and into heavy duty load responses gives the person time to brace or at least be somewhat prepared before the leash becomes a taut leash, and therefore avoids injury or even discomfort that might have otherwise resulted without the present invention.

Another problem with prior dog leashes is when very small petite dogs are on the leash and the person yanks on the leash unexpectedly, there is a significant exposure to injury to the animal because it is not able to anticipate the person's change in direction or pulling command, and as a result often sustains an injury. The subject invention addresses this problem by providing an application of the resilient device which includes a light duty response feature which transitions into heavier duty load response features, which gives the dog time to respond to the change in leash control and avoid injury.

The same features of the present invention that provides safety for small dogs is applicable to a consumer using an I-Pod, Cell Phone, or similar relatively small electronic device. Said device is provided a means to avoid shock from incidental falls out of a hand by incorporating the resilient device of the subject invention into a wrist strap tether connected to the hand-held device.

Another problem with prior shock absorber devices is that they can fail and break allowing the two entities at the ends of the tether to become separated and/or disconnected from each other. The present invention addresses this problem by providing a resilient device that is not a connection or link in the tether so that if the resilient device breaks or fails, the two entities are never disconnected from each other because the tether will still be intact.

Another feature of the resilient device is that the assembly is designed such that the ultimate tensile breaking point of the resilient element is not possible to reach before the tether is fully displaced. Therefore, the resilient element is prevented from being exposed to tensile breaking force. In addition, even if the resilient element is damaged or compromised for some reason, the tether will remain intact.

Another feature of the subject invention is that it provides a means to locate multiple resilient devices at various locations along the tether to accomplish very specific and/or tuned load response characteristics. One such example is a preferred embodiment of the invention wherein a light duty load response device is located on a dog leash near the dog end of the leash which is relatively light weight and non-bulky and provides the dog with instant response time if the person does something with the control of the leash that the dog did not anticipate. A second heavier duty resilient load response device is provided near the person end of the leash which is easily manipulated by the person and provides a secondary load response force allowing the person a response time if the dog does something unexpected to challenge leash control.

Another feature of the present invention provides a hand grip in combination with the resilient device such that the hand grip is oriented axially relative to the pull direction of the leash. This orientation of the hand grip provides a form of shock absorption by allowing the natural contours of the person's hand and the hand grip to slightly slip past each other which absorbs and dissipates substantial force while at the same time providing optimum control of the tether and the resilient device.

The relative axial translation and/or slippage occurs via the person's skin stretching against the hand grip and/or a relatively loose grip and/or the surface of the hand grip designed to have resilient contours that flex in response to axial translation. A further advantage and feature of the subject invention includes a wrist loop to provide a backup retention of the leash in the event the person completely loses their grip. The wrist loop also provides additional shock absorption means in combination and series with the other resilient devices in the system.

Another advantage of the subject invention is provided by providing a hand grip that is not secured to the leash strap but rather allowed to adjust so as to provide a means of location. The adjustable hand grip also forms a means to cinch the wrist strap tighter or looser depending upon the position of the hand grip. The axial adjustment of the hand grip is limited by use and employment of displacement restrictors which limit axial adjustment of the hand grip along the leash. One such axial adjustment restriction method is the use of stops fastened or sewn or embedded into the leash.

Another axial adjustment restriction method of the hand grip is the location and presence of one of the resilient devices. Another axial adjustment restriction method is the location and/or presence of a buckle or ring or other hardware. Those skilled in the art will readily appreciate there is a plethora of methods suitable to restrict axial adjustment while maintaining the spirit of the feature of the adjustable position hand grip.

Another advantage and feature of the subject invention is that the leash and/or components of the leash can be made from reflective materials and/or have reflective materials attachable to the leash so as to provide additional safety for walking the dog in low light situations. One preferred embodiment of the subject invention employs reflective threads sewn the length of the leash strap material.

Another advantage of the subject invention applied to a leash type product provides superior shock absorption for a person using the subject invention with non-domesticated animals such as horses, show cows, goats, pack animals, circus animals, carnival riding animals, parade animals, veterinarian offices, animal shelters, animal control officers, and other such scenarios. The relative unpredictability of such non-domesticated animals combined with their relative size is able to benefit greatly from the shock absorbing features of the subject invention.

A preferred embodiment of the subject invention envisioned for use with horses and/or large animals includes a hand grip, but does not include a wrist loop. A wrist loop may be a safety risk when tethered to a large animal because of risk of injury if said animal bolts or jerks excessively because the user can be caught in the wrist loop and unable to release themselves from the leash. Therefore, one preferred embodiment of the subject invention includes a hand grip on the end of the leash that does not feature a wrist loop.

Another preferred embodiment of the subject invention used as a horse or large animal leash provides a hand grip with a slight flange at the butt end of the hand grip which allows a more secure hold against pulling by the animal and yet allows the user to disengage from the leash easily and without concern of being caught or entangled.

Another advantage of the subject invention applied to animal leashes provides a resilient link assembly that can be connected to most common prior leashes and therefore effectively upgrade and improve prior leashes by incorporating the benefits and features of the present invention into known leashes. Typical leashes include simple tether leashes as well as the more complex retractable leashes.

Another advantage of the subject invention is provided by combining the resilient element positioned inside a tube structure in combination with other elements of the subject invention. The tube structure is able to house the resilient element as it extends, preventing any entanglement of the action of the resilient element with anything. In addition the esthetic attributes of the assembly are enhanced.

A further advantage of the tube structure is that it provides a further measure of shock absorption by providing lateral displacement similar to the flexing of a fishing pole, only not as extreme. This lateral tubular flexibility in combination with other elements of the subject invention provides substantial shock absorption and/or response time for the person and/or the animal.

There is an old saying that "you can pull a rope but you can not push a rope". There is an applicable element of that saying that applies to the present invention in that with a normal leash, one can pull a dog and/or keep the animal from extending away from the person. However, with a normal leash, one can not push the dog away from the person to maintain a certain distance from the person. The subject invention addresses this problem by providing a tubular extension leash in combination with other features of the subject invention such that the tubular extension provides a means for the person to establish and maintain a certain distance between the person and the dog if need be for training and/or aggression purposes.

Another advantage and feature of the tubular extension in combination with other features of the subject invention is that the tubular extension can be constructed from a clear or translucent material such that a light disposed to shine through the tube from near or inside the hand grip will cause the entire tube to glow and/or provide illumination along the length of the tube while at the same time shinning out of the end of the tube on the ground similar to a flashlight. This dual purpose light housed in the tubular extension provides additional safety for walking the dog in low light situations A problem with prior dog leashes which provide a retractable feature for the leash is that at times when the leash is pinched by a braking mechanism and/or the leash is at full extension, there is no means to provide shock absorption if needed. The subject invention addresses this problem by providing various shock absorbing features in combination with each other along with a retractable leash feature. The retractable mechanism can incorporate a braking feature and/or a light feature and/or pinching feature and still maintain the spirit of the subject invention.

Another advantage of the subject invention is that the hand grip component can be designed to house a resilient element inside in combination with a telescopic sleeve portion, which provides yet another shock absorption method which can be employed individually and/or in combination with other shock absorbing features of the subject invention.

Another advantage of the subject invention applied to animal leash products provides a resilient link assembly that can be connected to most any common prior leash products and therefore effectively upgrade and improve a prior leash product by incorporating the benefits and features of the subject invention into a prior leash product. Typical leash products include simple tether leashes as well as the more complex retractable leash products.

Another advantage of the subject invention is the application of vehicle towing straps, in that prior towing straps inevitably generate a hard jerk as the towing strap becomes a taut tether between two vehicles. This problem can cause damage to the vehicles and/or loss of control of one or both vehicles involved in the towing scenario. In addition, the frequent hard jerk that drivers of the vehicles experience using prior towing straps can cause injury or at the very least discomfort and/or uneasiness and lack of confidence that the vehicles are being maintained under control. The subject invention addresses this problem and overcomes it by providing a vehicle towing strap with resilient elements incorporated into the strap such that a taut towing strap is preceded by a gentle stretching of the resilient elements. As the resilient elements transition from relative light duty loads to heavy duty loads the vehicles are afforded the opportunity to initiate towing motion avoiding taut jerks. In prior towing straps towing motion cannot and does not initiate until after generating a taut jerk.

Another advantage of the subject invention applied to towing strap products provides a resilient link assembly that can be connected to most common prior towing strap products or even towing chains and therefore effectively upgrade and improve a prior towing strap or towing chain product by incorporating the benefits and features of the subject invention into a prior towing product.

Another advantage of the subject invention is that the resilient elements can be tuned and/or matched to the rating of the towing strap loads and are assembled such that if a resilient element fails, the towing strap remains intact to carry the full load.

Another advantage of the of the subject invention provides a towing hitch attachment which is attachable to common hitch bars such as the "Reese Hitch" systems. The subject invention provides such a hitch attachment with a telescopic housing and a resilient device housed therein which allows the telescopic portions of the hitch housing to slip axially relative to each other with smooth shock absorption features and capabilities. The subject invention applied in this fashion cooperates with standard prior towing straps and/or chains to effectively upgrade and improve a prior towing strap or towing chain product by incorporating the benefits and features of the subject invention into a prior towing hitch product.

Another advantage of the subject invention is manifested when applied to a child restraint tether product. There are numerous child safety tether products that incorporate a leash or tether product between an adult and a child to provide a measure of freedom of movement for the child while at the same time providing the adult with the assurance that the child cannot get lost in the crowd or get any farther away than the tether allows. However, one problem with prior child tether devices is that the child has a tendency to lunge suddenly in one direction or another catching the adult by surprise. Another problem with prior tether devices is that the adult can suddenly change direction on the child and catch the child by surprise. In both scenarios of surprise stated above, there is an opportunity for injury and/or unintentional discomfort at one end of the prior tether device or the other. The subject invention addresses this problem and overcomes it by providing a resilient device incorporated into the tether restraint system and/or providing a resilient link that cooperates with prior child tether devices to effectively upgrade and improve a prior child tether product by incorporating the benefits and features of the subject invention into a prior child tether product. The subject invention provides a measure of safety preventing unintentional injury to the person at either end of the tether device as well as an increased measure of assurance using the device.

Many applications exist in the prior records and examples in the market place of tether type devices applied as part of a safety system to prevent a person or equipment from falling from an elevated position. Examples of this kind of prior system can be found in construction for workers on bridges, steel erection, scaffolding and/or roofing. Modern installations of cell towers and wind turbines require and ever increasing number of workers and equipment to be exposed to the threat of fall from elevated positions. Still other examples of safety tethers are found being used by various utility workers, tree loggers. Still other examples of safety tether devices are found in use related to activities using a bucket on the end of an extending arm to raise a worker up to elevated positions such as tree trimming specialists, outdoor sign companies, deicing sprayers at airports, and other similar bucket trucks. Other examples of prior systems can be found applied to window washers of high rise buildings. Other prior applications include rock climbing activities, whether for sport of for rescue. Still other prior applications include warehouse workers using high-bay shelving storage systems. Still another prior application includes sport hunting using elevated tree stands and blinds from which the hunter is subject to fall injury. One problem with all of these applications of safety restraint tethers is that once the equipment and/or person falls and comes to the end of the tether; they experience a hard taut jerk. This jerk may not be as injurious as the fall might have been without the tether device, but the hard jerk stop can be quite injurious just the same and/or damaging to the equipment. The subject invention addresses this problem and overcomes the problem by providing a resilient element that is capable of either being incorporated into the prior device and/or connected to the prior device to essentially upgrade and improve a prior safety tether product by incorporating the benefits and features of the subject invention into a prior safety tether product.

Another advantage of the subject invention is to provide a resilient tether tie-off for water craft at dockside or other tie-off scenarios such that the secured water craft has a modicum of resilient movement to accommodate waves, tides, and/or other variant forces acting upon the secured water craft.

Another preferred embodiment of the subjection invention provides a cover that is permanently attached to the tether and is positioned to cover one of the resilient devices and also provide enough volume to double as a cover bag for the entire tether bundled up for storage, said dual purpose cover bag having one end fitted with draw string or other suitable closure means.

Another advantage of the subject invention is featured in a preferred embodiment such that a relatively mid-length leash product of about 12" to 36" is provided comprising a wrist loop, hand-grip, at least one resilient device, and a clasp for attaching to an animal assembled in said relatively short length for the envisioned purpose of close training, transport handling of the animal, or other times when the user desires the animal to remain in close proximity and control.

Another advantage of the subject invention is featured in a preferred embodiment such that a pull-toy assembly is provided wherein a relatively short length of leash strap is fitted with at least one resilient device and a hand grip is provided on one end with a chew toy provided on the other end. In one preferred embodiment of the pull-toy assembly a means is provided such that the chew toy end is replaceable. Said replacement means include a buckle, snaps, hook-latch, ties, or any one of a plethora of suitable fastening-unfastening means. In another preferred embodiment of the pull-toy a pocket is provided in the strap assembly wherein a treat for the pet can be placed and safely kept until the user is removes it. The treat cannot be reached by the animal, though it is placed such that the animal can smell it and be aware of its presence. The treat can be recovered by the user and used as a reward or other training method for the animal. Recreational users and professional dog trainers can readily make advantageous use of this type of treat delivery system because of it being combined with benefits of the resilient element features of the subject invention.

Another advantage of the subject invention is featured in a preferred embodiment such that a secondary wrist loop located near the animal end of a dog leash application which provides the user the ability to cinch the animal up close and secure the leash via the wrist loop. Said secondary wrist loop does not extend laterally from the axial projection of the leash so as to prevent becoming caught or entangled. One preferred embodiment of said secondary wrist loop employs a hook-latch device to assist the two parallel portions of the secondary wrist loop to stay together against each other until the user employs the secondary wrist loop feature.

Another advantage of the subject invention is that the resilient element converts a typical choke collar into a more humane and practical device. A choke collar is greatly improved with the resilient element incorporated into the collar.

Another advantage of the subject invention is that the resilient element converts a traditional Martingale type choke collar into a more humane and practical device. A Martingale type collar is greatly improved with the resilient element incorporated into the collar.

Other advantages and features of the subject invention will be apparent to those skilled in the art without abandoning the spirit of the subject invention, as articulated in this list of non-exhaustive claims and disclosures.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a perspective view of a preferred embodiment of the present disclosure in the application of a leash;

FIG. 3 is a perspective view of the leash of FIG. 2 with the resilient element extended in response to a pulling force;

FIG. 4 is a perspective view of another preferred embodiment leash product having a resilient element assembled into a strap of serpentine shape;

FIG. 5 is a front elevational view of a stretched out leash of FIG. 4 having the serpentine strap stretched in a taut position with the resilient element in a stretched position;

FIG. 6 is a plan view of the leash of FIG. 2;

FIG. 7 is a plan view of the resilient element of FIG. 2 in a relaxed state;

FIG. 14 is a front perspective view of another embodiment resilient element having an elastic cord and termination knots;

Figure 18:
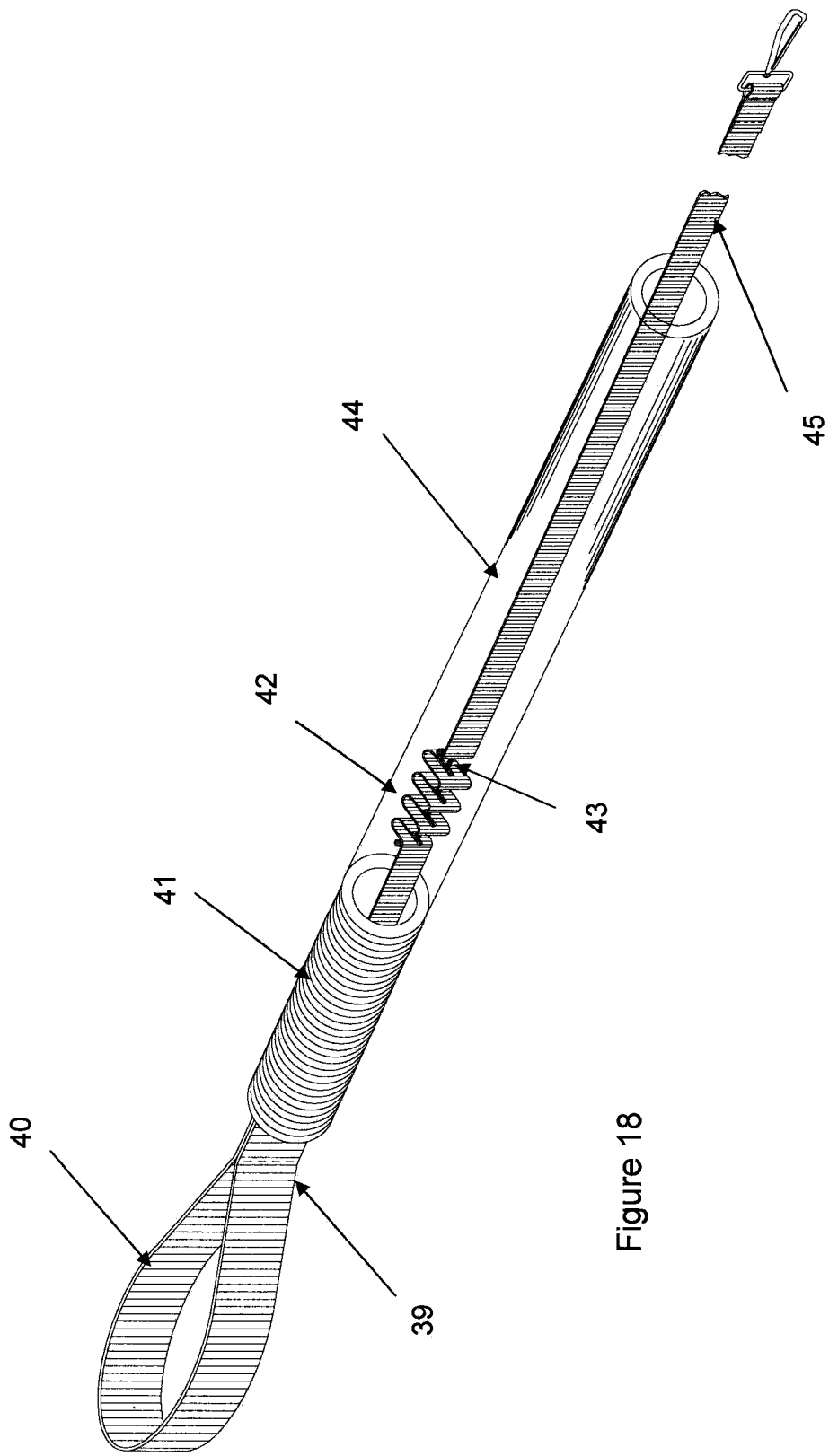
Figure 19:
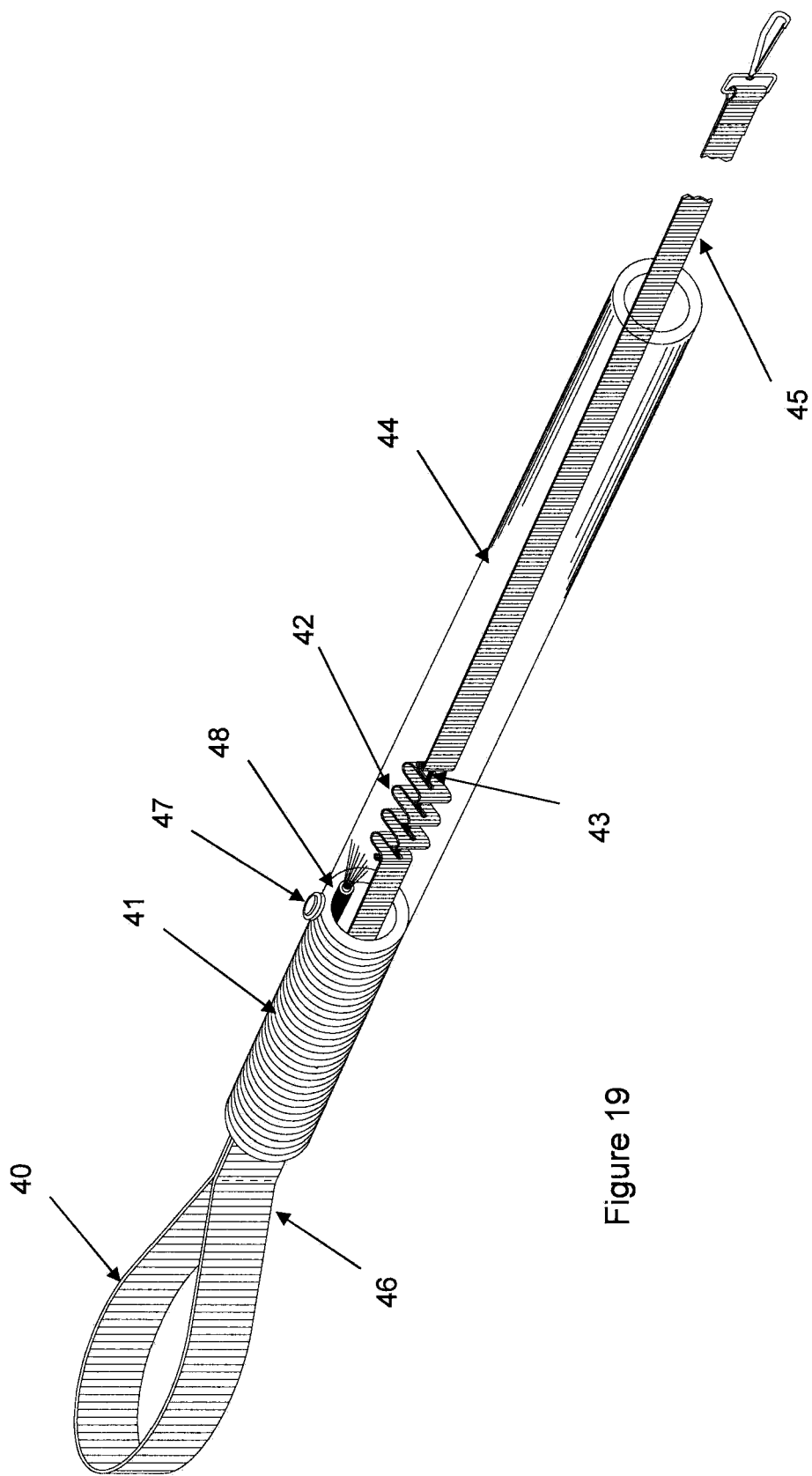
Figure 20:
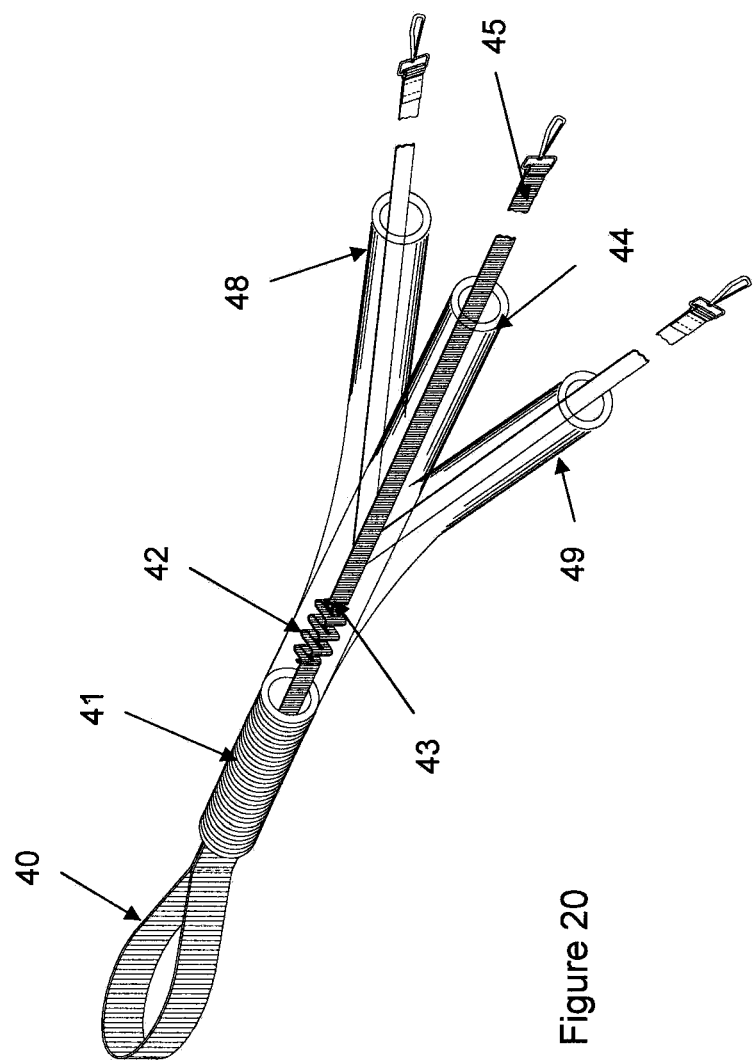
Figure 21:
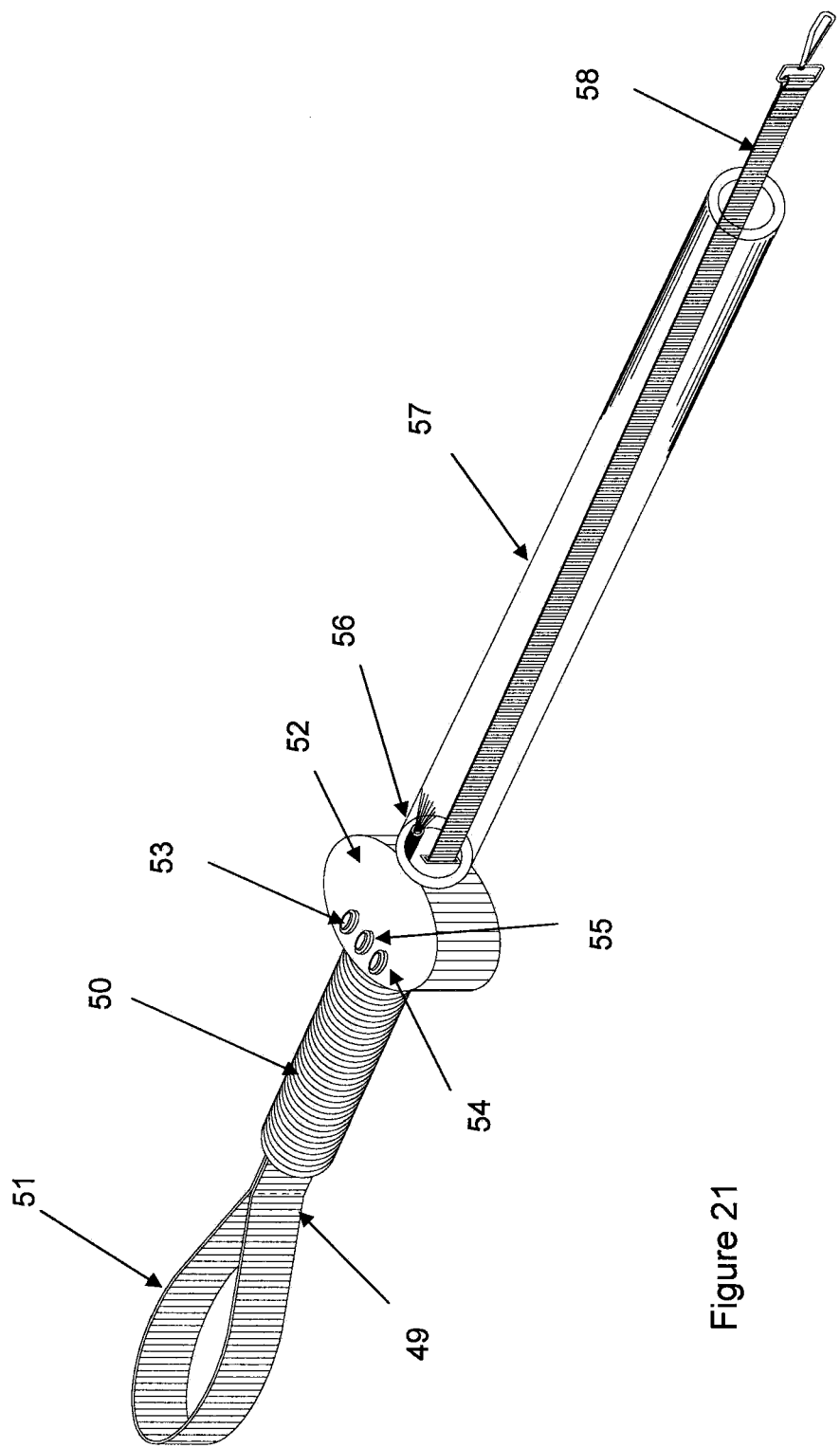
Figure 25:
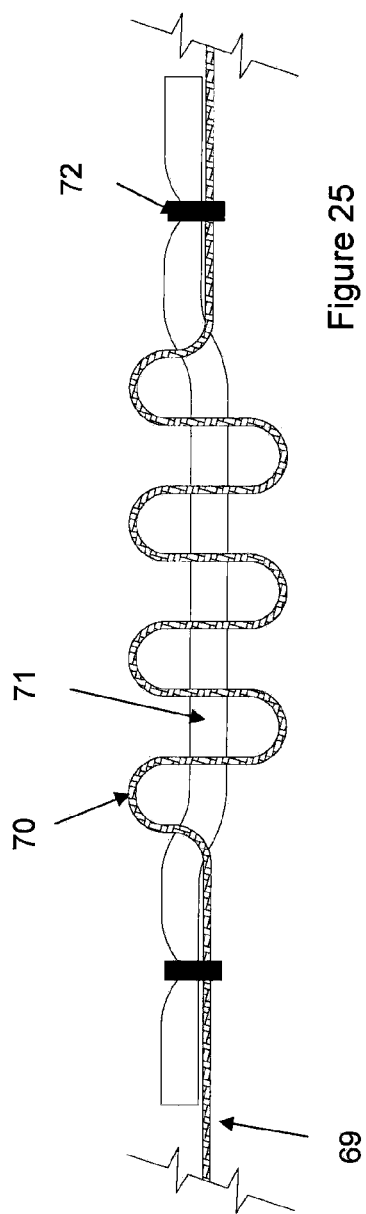
Figure 26:
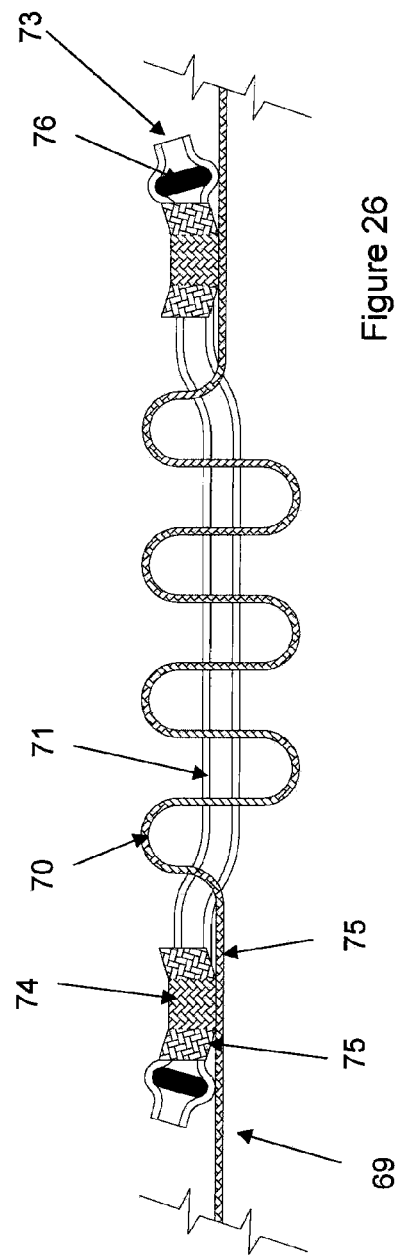
Figure 36:
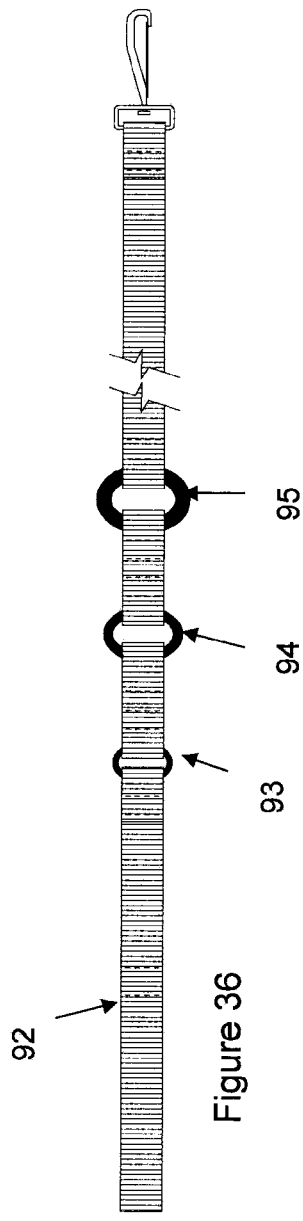
Figure 37:
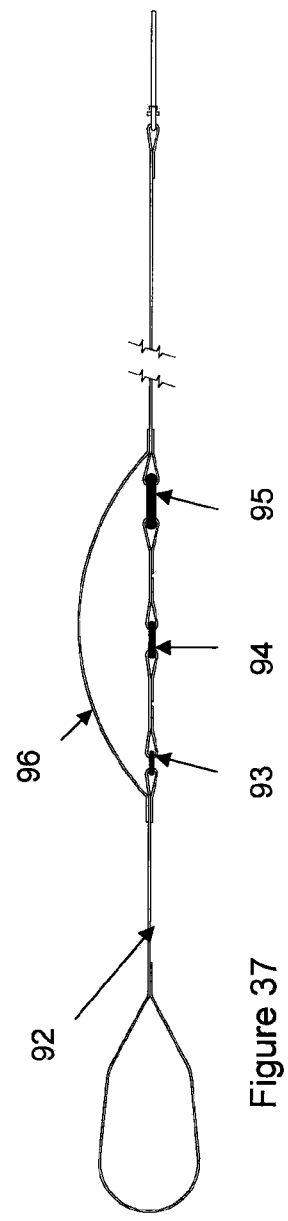
Figure 38:
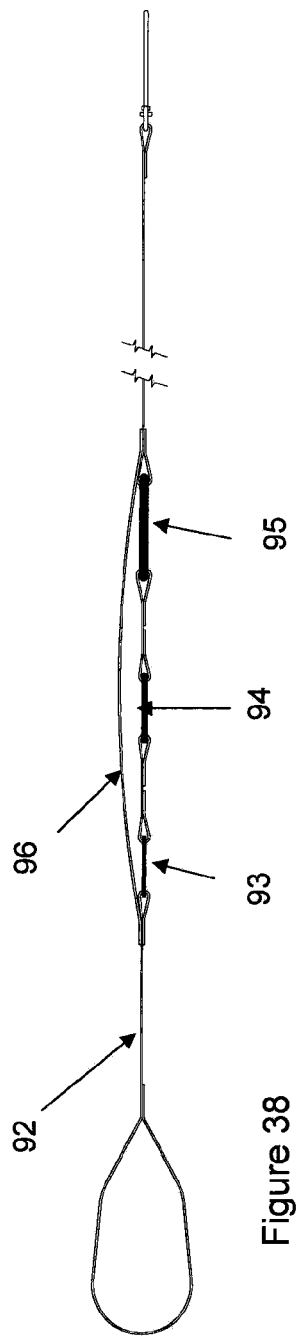
Figure 39:
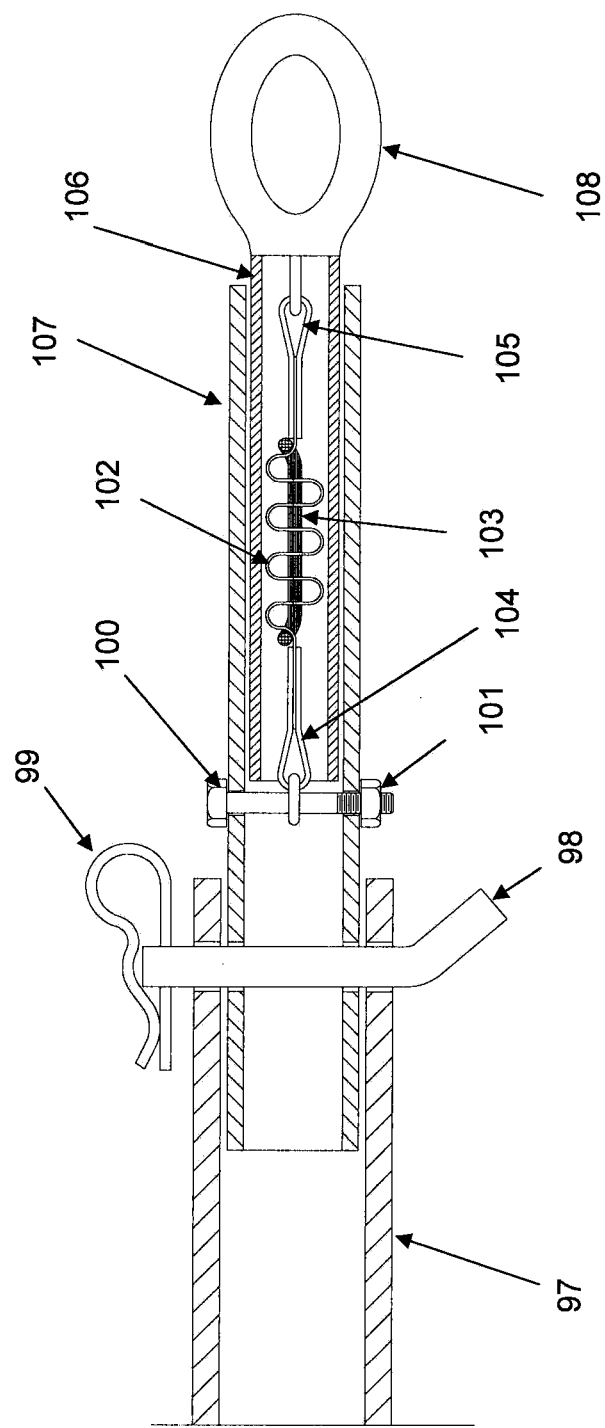
Figure 40:
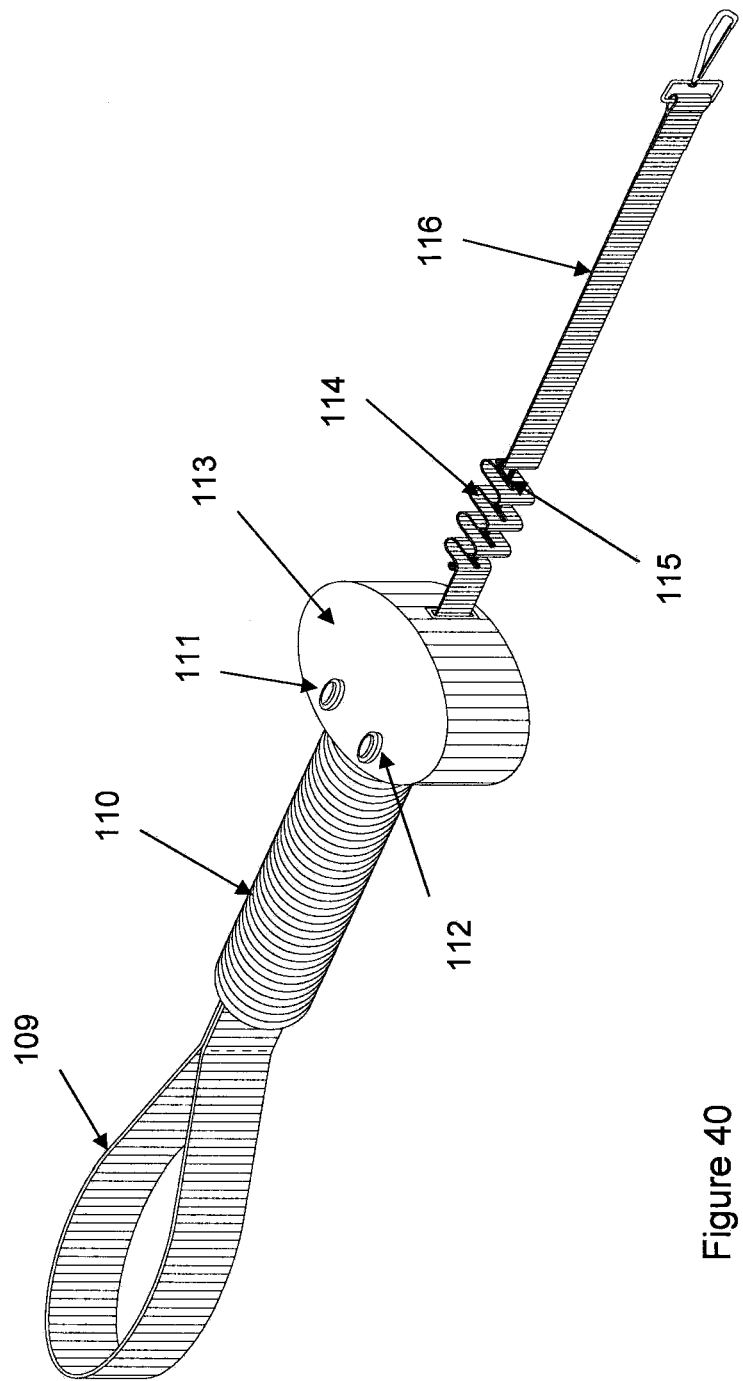
Figure 41:
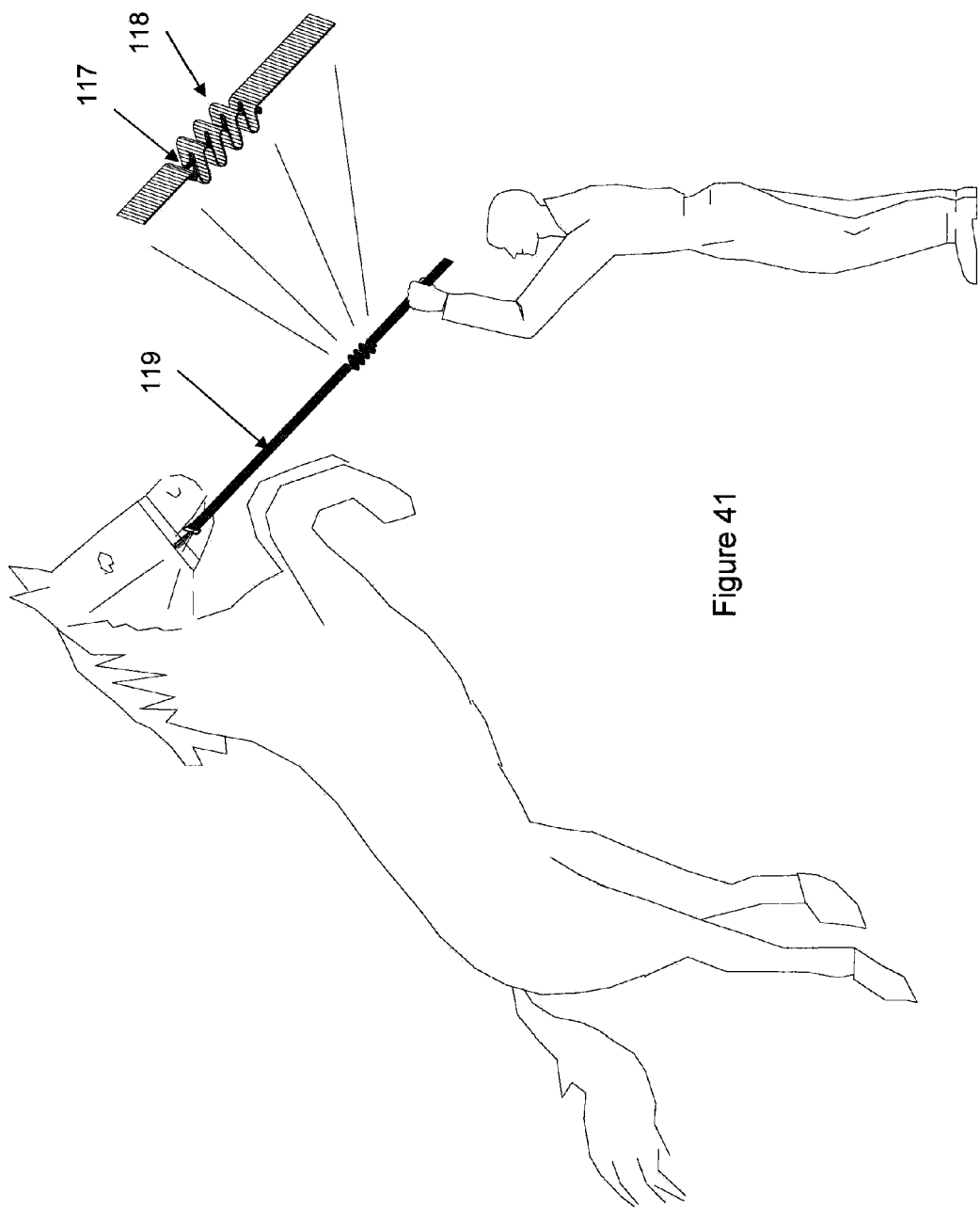
Figure 42:
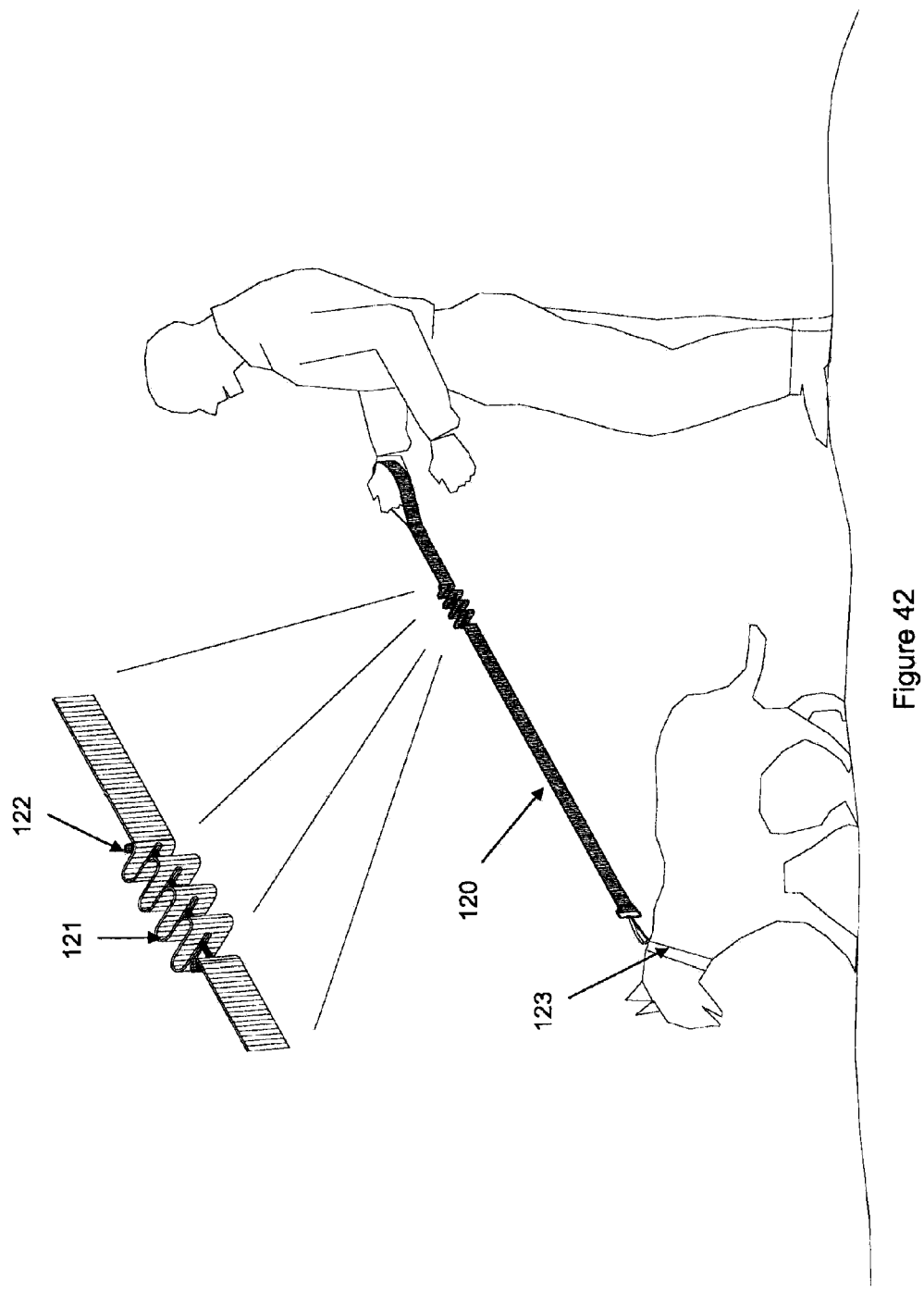
Figure 43:
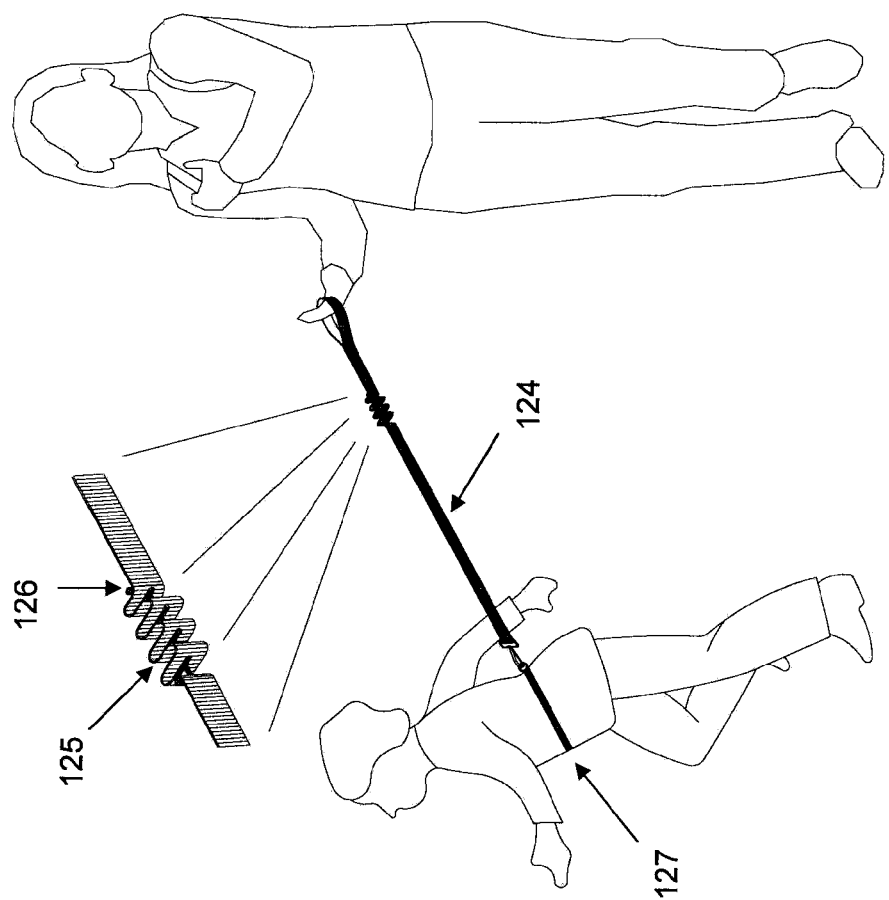
Figure 44:
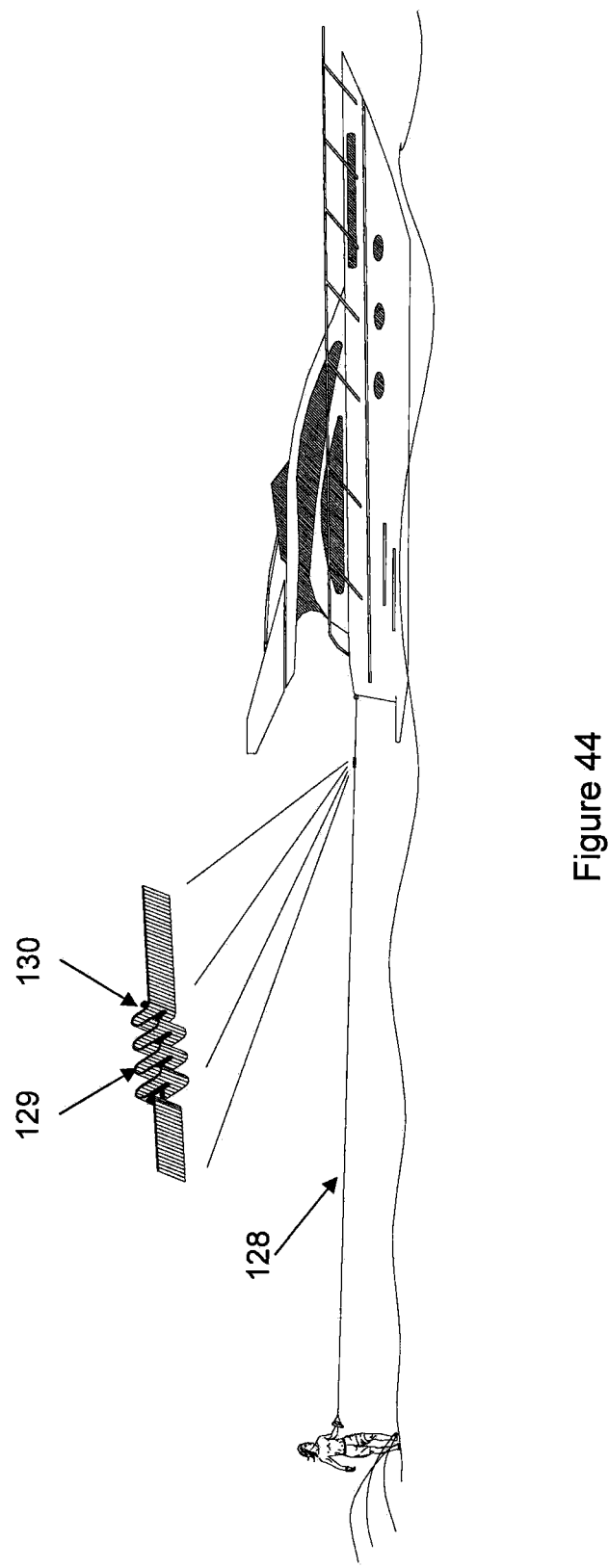
Figure 45:
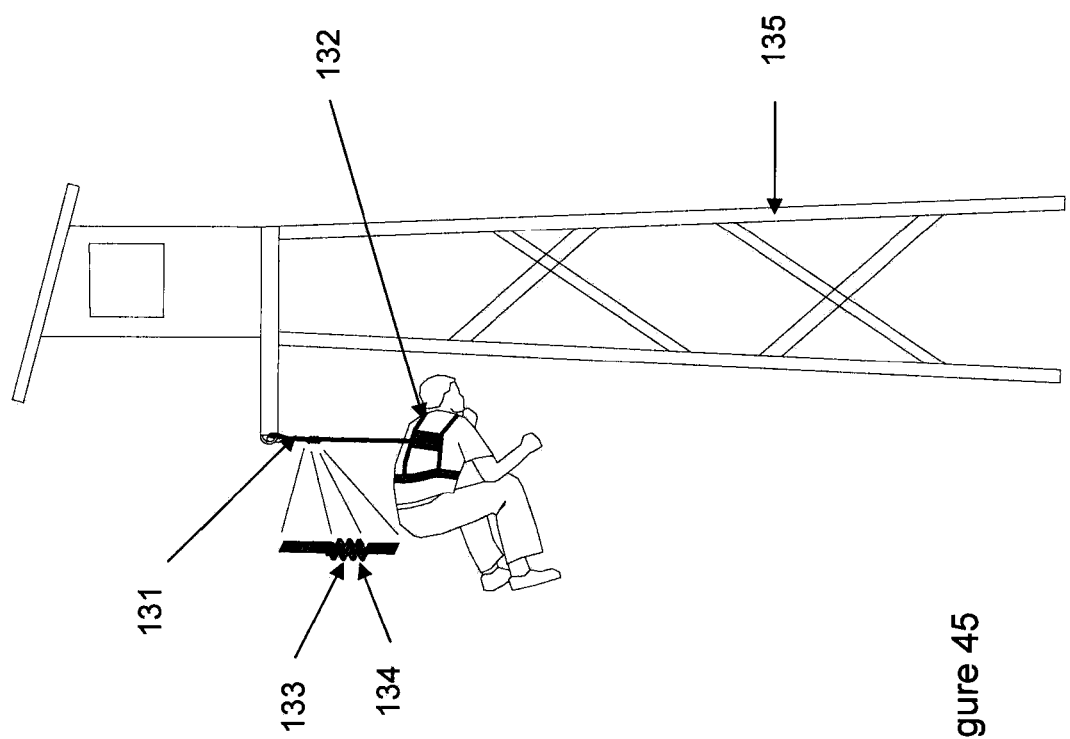
Figure 46:
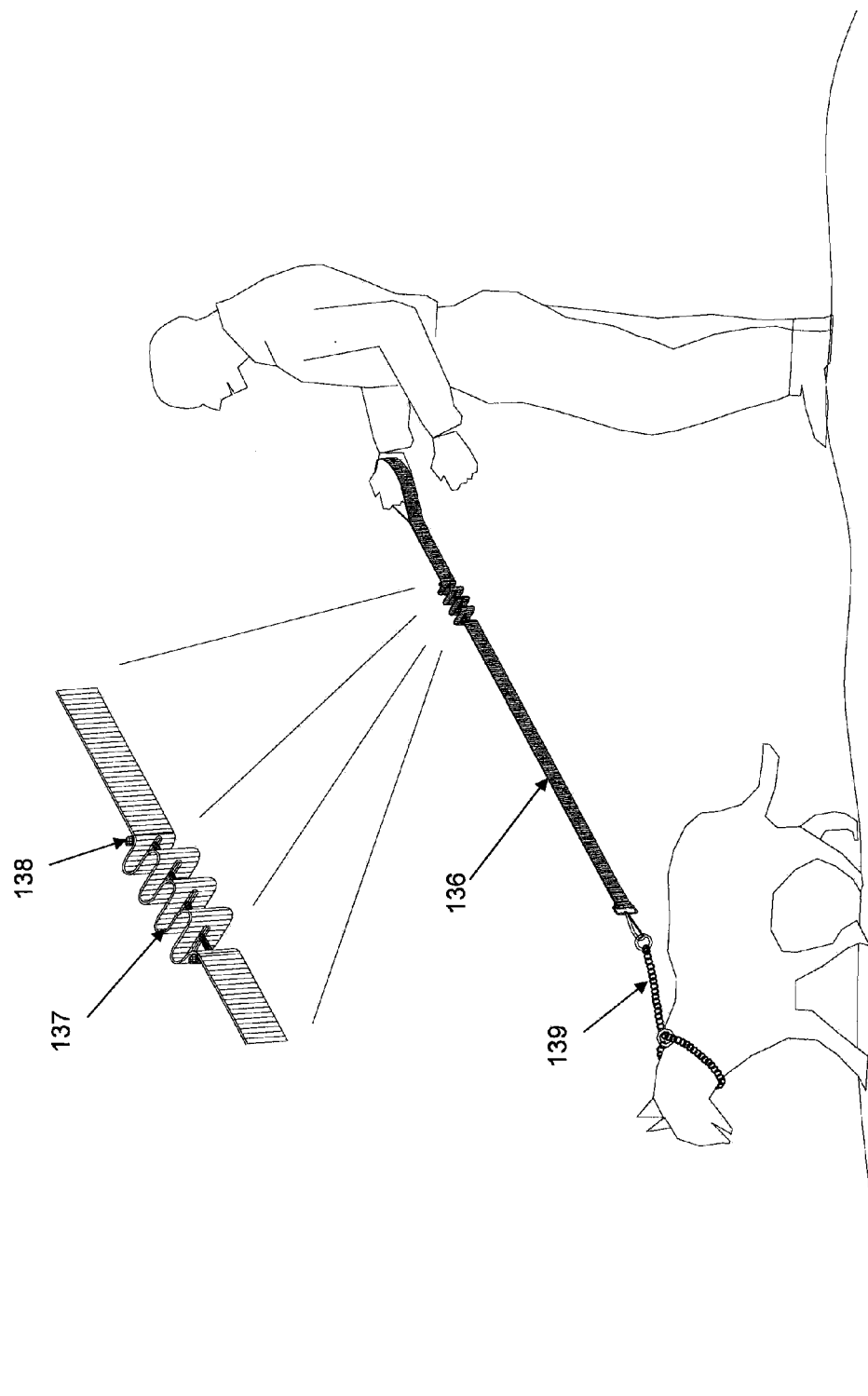
Figure 47:
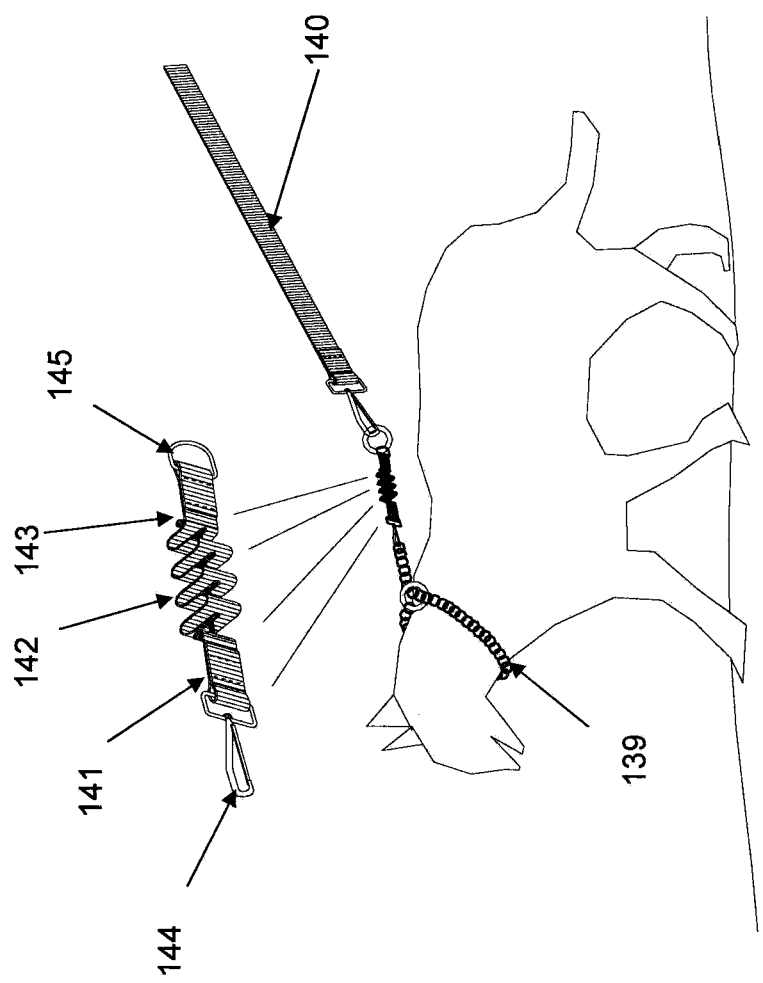
Figure 50:
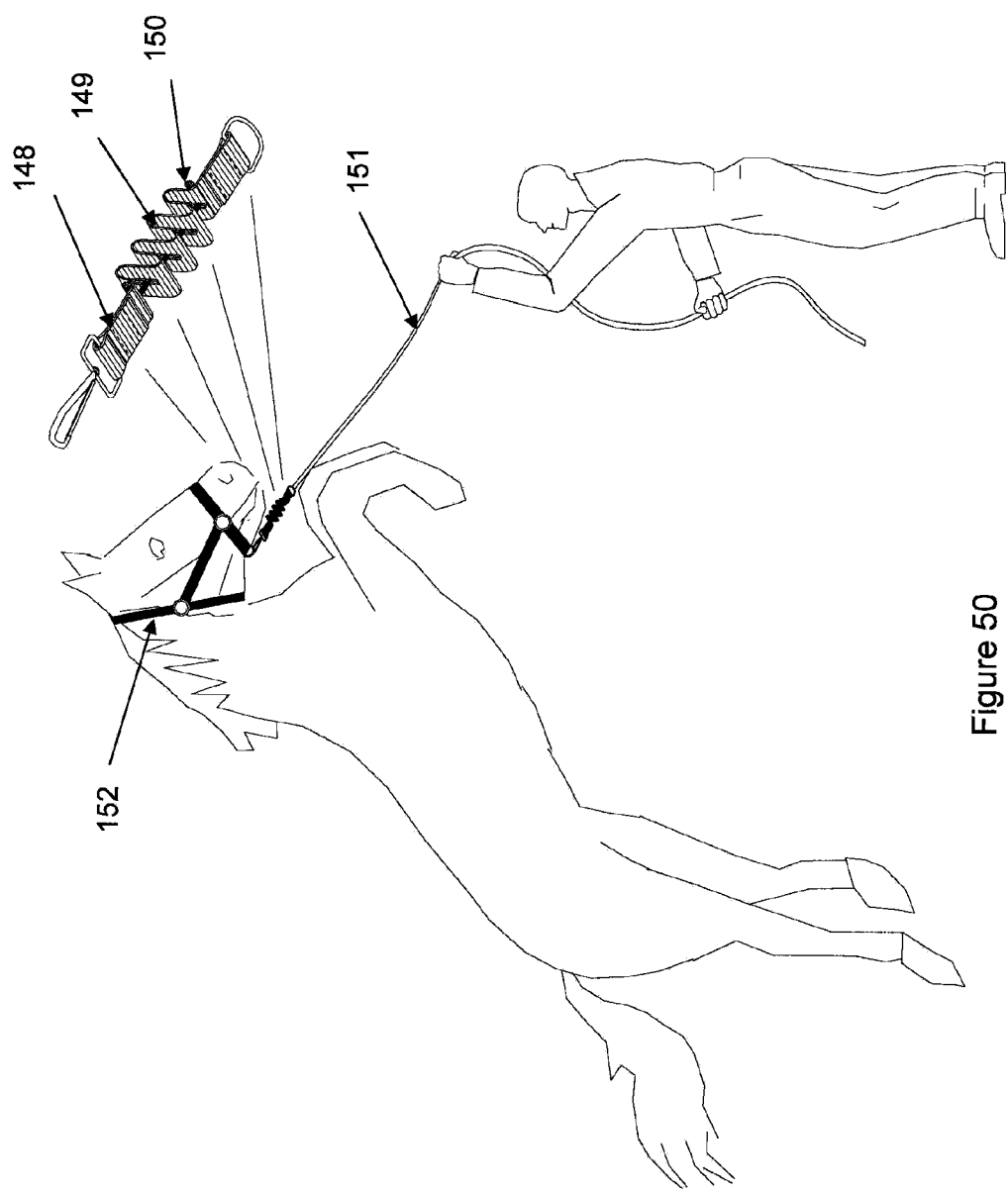
Figure 51:
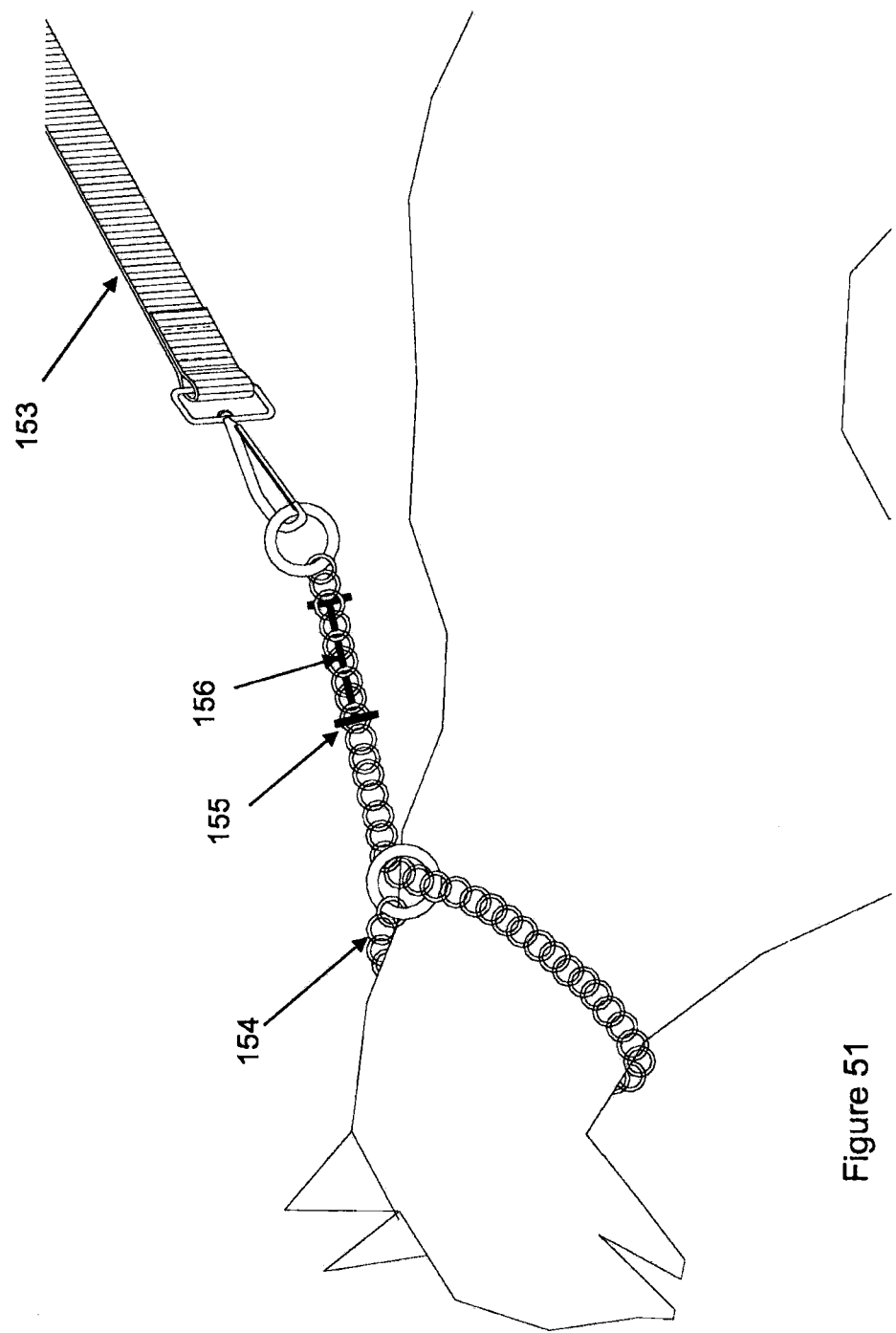
Figure 52A:
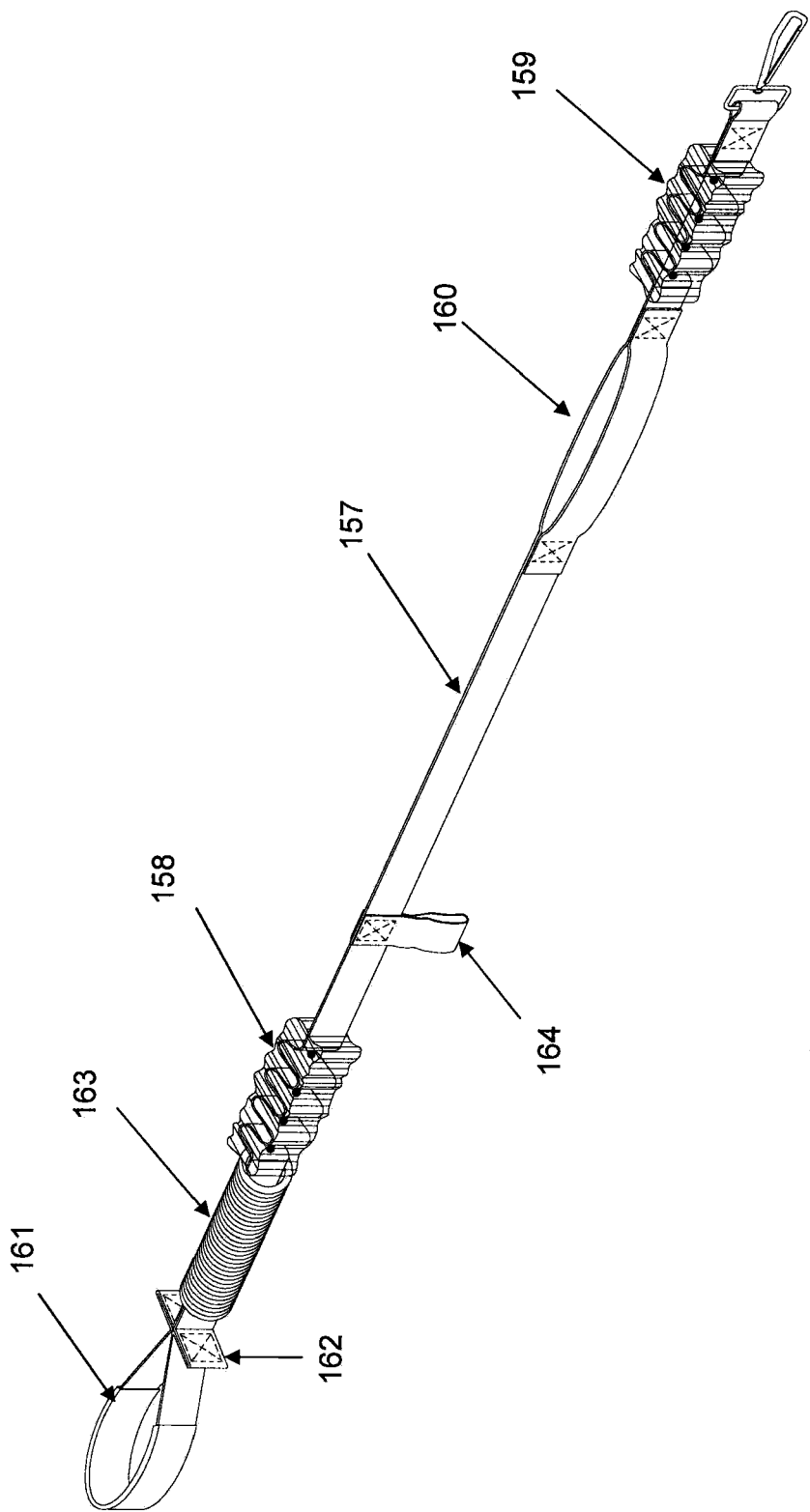
Figure 52B:
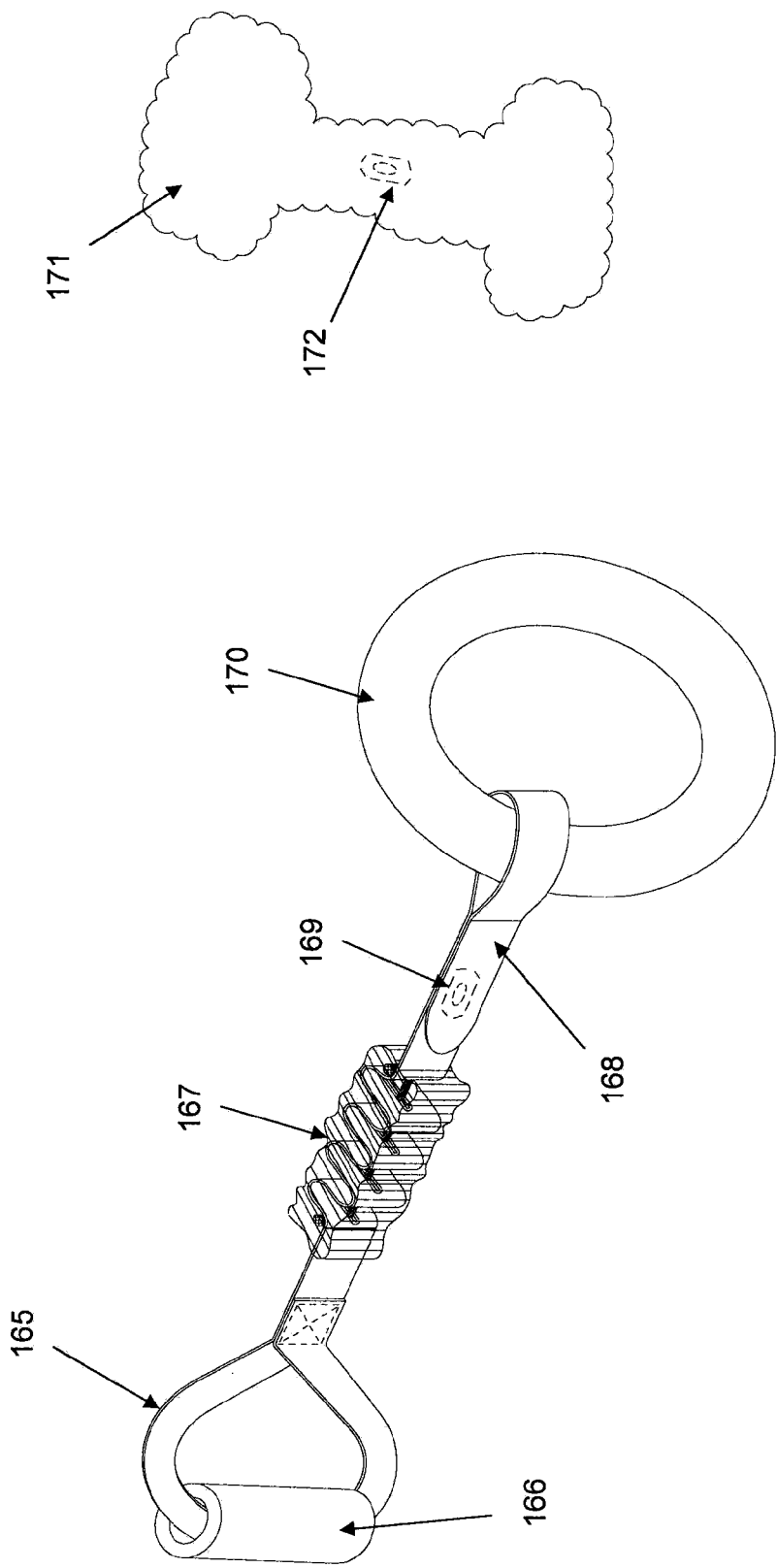
Figure 55:
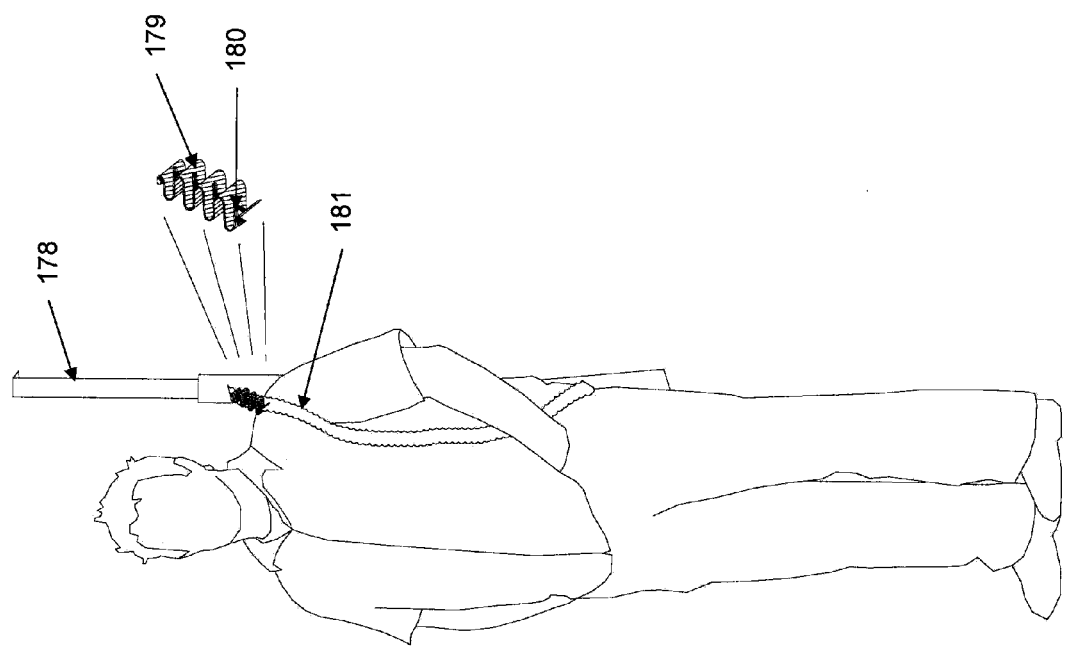
Figure 56:
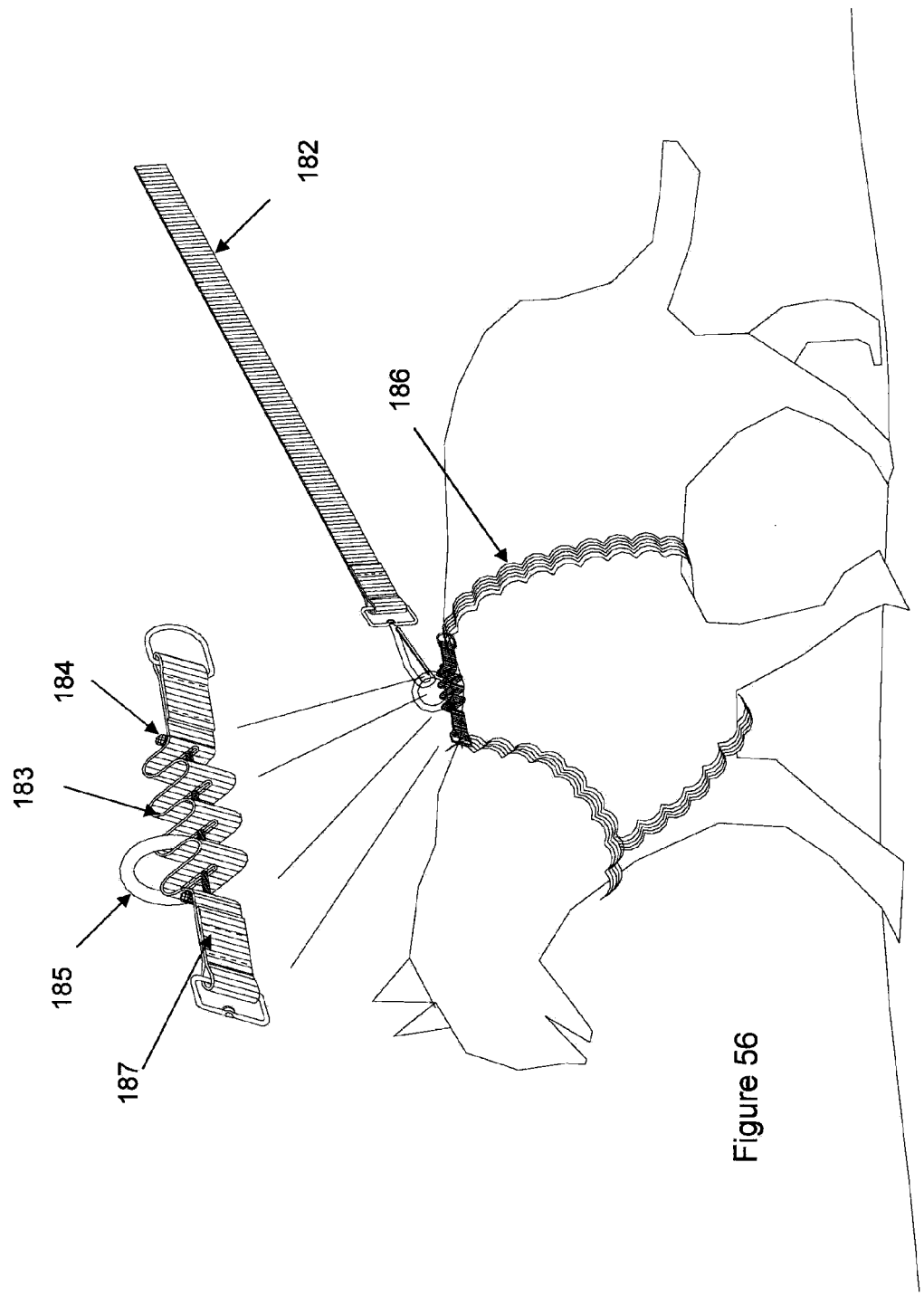
Figure 57:
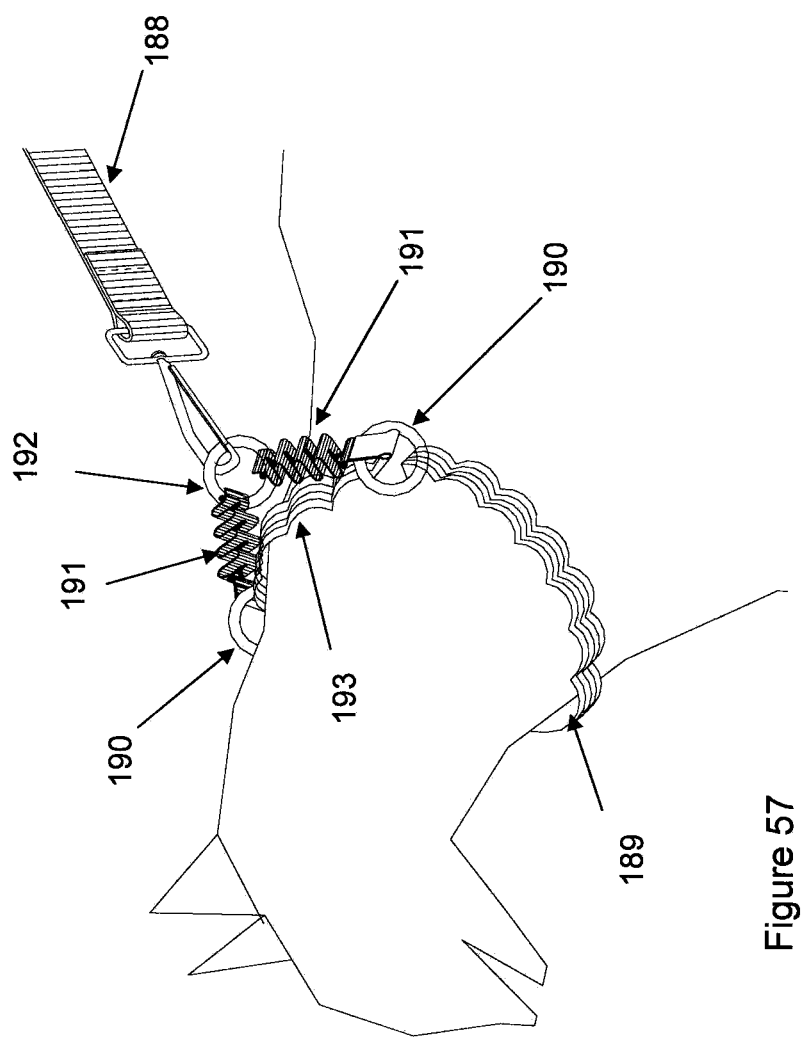
Figure 58:
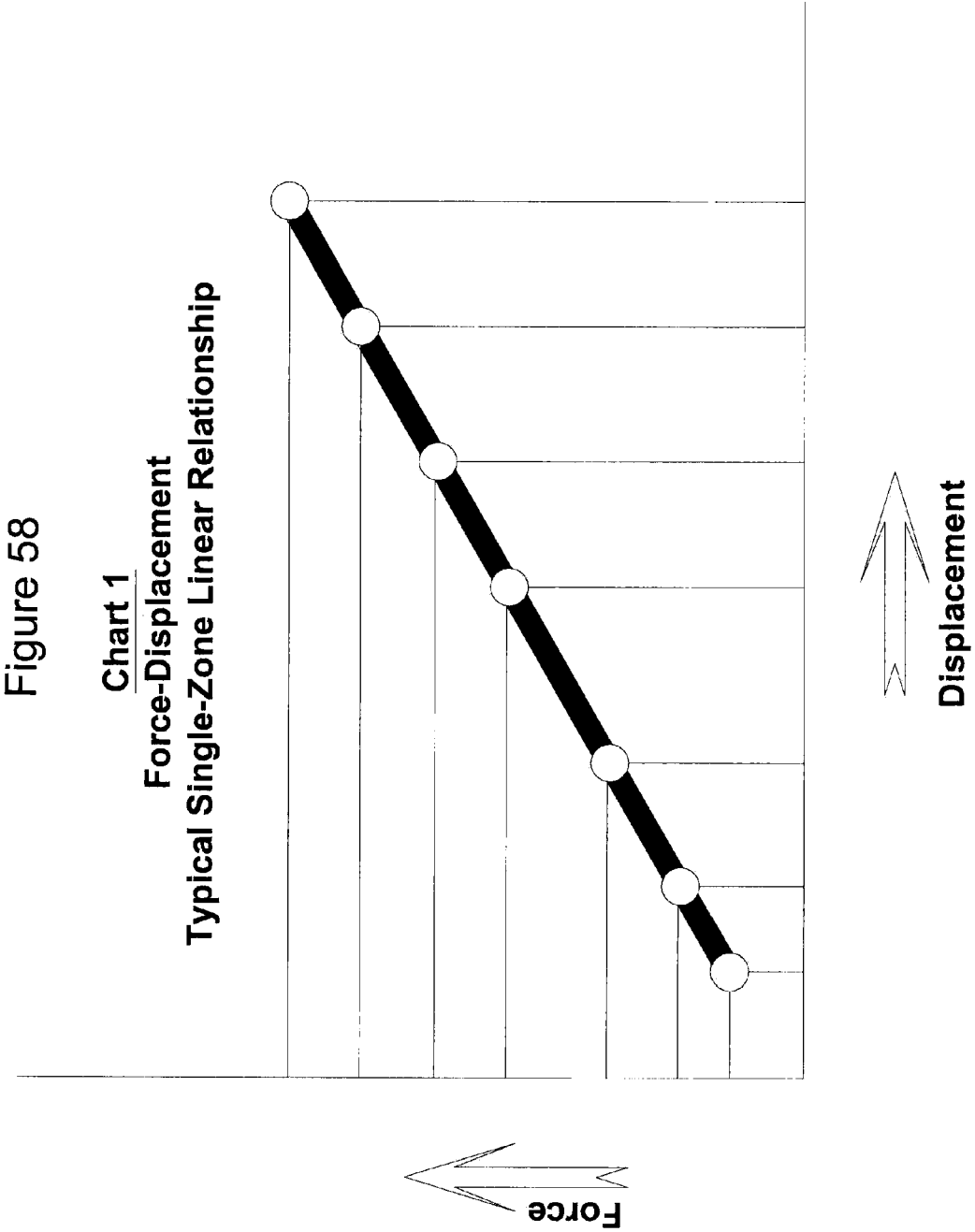
Figure 59:
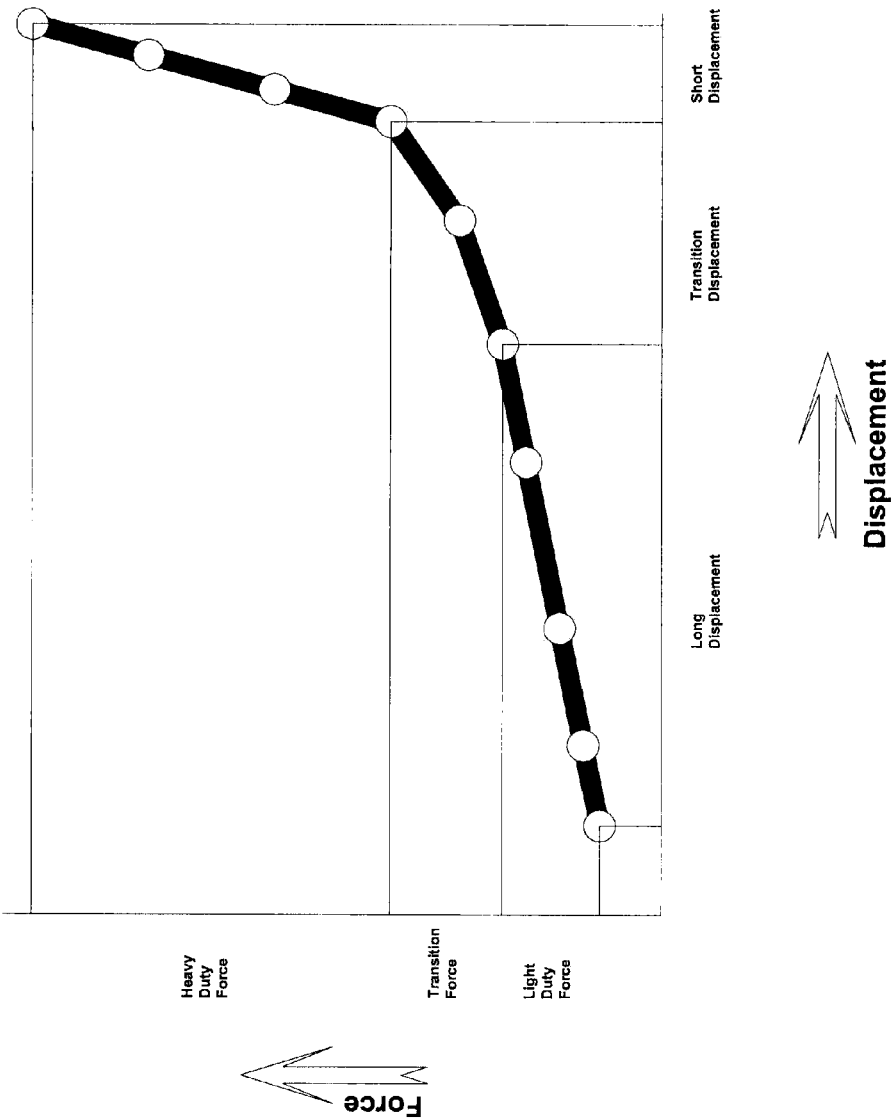

FIG. 15 a front perspective view of another embodiment resilient element having an elastic tube with a termination knot on one end and an alternate termination folding tube and termination disk;

FIG. 16 is a front perspective view of another embodiment of a leash including a hand grip disposed between a wrist loop and serpentine portion containing a resilient element 37;

FIG. 17 is a front elevational view of the leash of FIG. 16 with the serpentine portion and resilient element in an extended position;

FIG. 18 is a front perspective partial cross sectional view of another embodiment of a leash having a hand grip disposed between a wrist loop and a tube extension with a serpentine housed inside the tube extension;

FIG. 19 is a front perspective partial cross sectional view of the leash of FIG. 18 further including an integral light and control switch housed inside the tube extension;

FIG. 20 is a front perspective partial cross sectional view of the leash of FIG. 18 demonstrating lateral flexibility of the tube;

FIG. 21 is a front perspective partial cross sectional view of another embodiment of a leash having a hand grip disposed between a wrist loop and a retractable tether mechanism and tube extension;

FIG. 22 is a partial cross sectional top plan view of another embodiment of a leash having a wrist loop, a telescopic hand grip assembly with an outer housing and an inner housing, a retractable mechanism, and a leash strap;

FIG. 23 is a partial cross sectional top plan view of another embodiment of a leash modified from FIG. 22;

FIG. 24 is a partial cross sectional top plan view of another embodiment of a leash modified from FIG. 22;

FIG. 25 is a top plan view of a tether portion assembled with a resilient element to form a serpentine having ends terminated and restrained using a wrap device;

FIG. 26 is a top plan view of a tether portion assembled with a resilient element to form a serpentine having a hollow tube with an opening at each end;

FIG. 27 is a top plan view similar to FIG. 26 of the tether portion assembled with the resilient element to form a serpentine, the hollow tube receiving an insert creating a bulge;

FIG. 28 is a top plan view similar to FIG. 26 of the tether portion assembled with the resilient element to form a serpentine, having the entire length of the tunnel fixed to a tether;

FIG. 29 is a front perspective view of another embodiment for a towing strap;

FIG. 30 is a front perspective view of the towing strap of FIG. 29 in elongated position;

FIG. 31 is a front perspective view of another embodiment for a towing strap having a towing strap link;

FIG. 32 is a front perspective view of the towing strap of FIG. 31 in elongated position;

FIG. 33 is a top plan view of a heavy duty resilient element of the present disclosure;

FIG. 34 is a top plan view of a light duty resilient element of the present disclosure;

FIG. 35 is a top plan view of another embodiment of a leash including a light duty resilient element with a corresponding serpentine and a heavy duty resilient element with a corresponding serpentine;

FIG. 36 is a front elevational view of another embodiment of a leash having resilient elements in shapes similar to O-rings;

FIG. 37 is a top plan view of the leash of FIG. 36 further showing a displacement limiter strap portion;

FIG. 38 is a top plan view of the leash of FIG. 37 in an elongated position;

FIG. 39 is a partial cross sectional plan view of another embodiment for a towing hitch assembly;

FIG. 40 is a front perspective view of another embodiment of a leash having a hand grip disposed between a wrist loop and a retractable housing, further having control buttons to provide tension control for a strap;

FIG. 41 is a front elevational view of a leash of the present disclosure having a resilient element and a serpentine assembly in use with a horse;

FIG. 42 is a front elevational view of a leash of the present disclosure having a resilient element and a serpentine assembly in use with a dog;

FIG. 43 is a front elevational view of a leash of the present disclosure having a resilient element and a serpentine assembly in use as a child restraint;

FIG. 44 is a front elevational view of a leash of the present disclosure having a resilient element and a serpentine assembly in use in skiing;

FIG. 45 is a front elevational view of a leash of the present disclosure having a resilient element and a serpentine assembly in use as a sport hunting safety restraint tether connected to an elevated tower;

FIG. 46 is a front elevational view of a leash of the present disclosure having a resilient element and a serpentine assembly in use with a dog choke collar;

FIG. 47 is a front elevational view of a leash of the present disclosure having a resilient element and a serpentine assembly in use with a dog choke collar on one end with a clasp attached to the leash via a ring;

FIG. 48 is a front perspective view of a leash of the present disclosure including a resilient element and a serpentine housed within a flexible sleeve;

FIG. 49 is a front perspective view of the leash of FIG. 48 in an elongated position;

FIG. 50 is a front elevational view of a leash of the present disclosure having a resilient element and a serpentine assembly in use with a horse halter;

FIG. 51 is a front elevational view of another embodiment of the present disclosure having a resilient element weaved through holes formed by links of a chain and retained by T-shaped ends;

FIG. 52A is a front perspective view of another embodiment of the present disclosure having multiple resilient elements positioned under protective covers;

FIG. 52B is a front perspective view of another embodiment for a dog pull toy having a hand grip, a resilient assembly in a cover and a chew ring retained by a strap;

FIG. 53 is a front perspective view of another embodiment of the present disclosure wherein a resilient element does not pass through holes in tether but is attached to the tether at both ends;

FIG. 54 is a front perspective view of the embodiment of FIG. 53 in an elongated position;

FIG. 55 is a front elevational view of another embodiment of the present disclosure wherein a gun includes a shoulder strap having a portion of the strap assembled with a resilient element and a serpentine;

FIG. 56 is a front elevational view of another embodiment of the present disclosure having a dog harness with an integral assembly containing a serpentine, a resilient element and an attachment ring;

FIG. 57 is a front elevational view of another embodiment of the present disclosure having a martingale style collar with resilient elements and serpentines in a strap portion free to slide through rings;

FIG. 58 is a chart showing linear force versus displacement for known tether devices; and FIG. 59 is a chart showing force versus displacement for a device of the present disclosure.

Corresponding reference numerals indicate corresponding parts throughout the several views of the drawings.

DETAILED DESCRIPTION

Example embodiments will now be described more fully with reference to the accompanying drawings.

Figure 1:
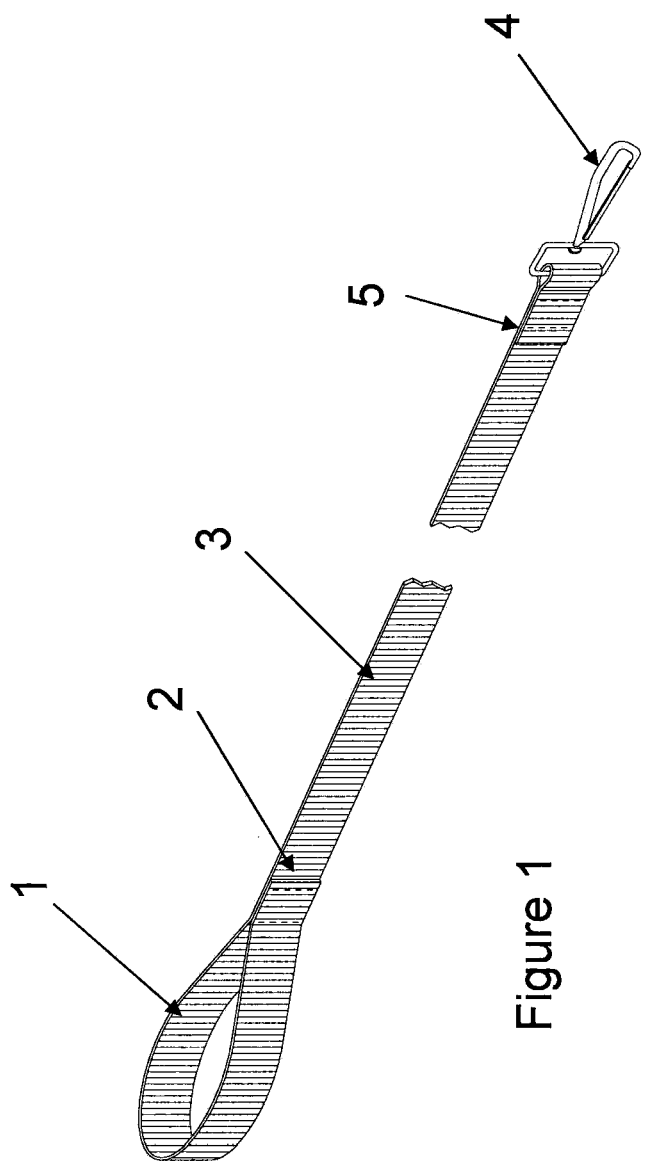
FIG. 1 is a perspective view of a typical prior dog leash having a wrist loop portion looped back on itself and attached at a joint with a strap length extending to an end portion clasp attached by strap loop joint.

Referring to FIG. 1, a 3D view of a typical prior dog leash is comprised of a wrist loop portion 1 looped back on itself and attached at joint 2 with strap length 3 extending to an end portion clasp 4 attached by strap loop joint 5.

Referring to FIG. 2, a 3D view of a preferred embodiment of the subject invention is provided in the application of a strap or leash 6 with a resilient element 8 assembled through holes positioned in a serpentine 7 section. Serpentine 7 section is ready for extension of leash 6.

Referring to FIG. 3, a 3D view of the leash from FIG. 2 provides resilient element 8 extended in response to a pulling force applied to the ends of the leash. Once pulling forces relax resilient element 8, the leash 6 retracts back to reform serpentine 7.

Referring to FIG. 4, a 3D view of another preferred embodiment leash 9 includes a resilient element 10 assembled into a relatively short format of a serpentine 11 such that this embodiment can be utilized with typical prior leash products to effectively upgrade the prior product to benefit from the inherent features of the subject invention.

Referring to FIG. 5, a profile view of the stretched out leash 6 of FIG. 3 shows serpentine 7 in a taut position while resilient element 8 is shown in a stretched position that is less than the ultimate tensile strength of the resilient element 8.

Referring to FIG. 6, a plan view of the leash 6 in FIG. 2 shows resilient element 8 as it passes through serpentine 7. When not exposed to displacement forces, resilient element 8 is retracted into a natural state causing serpentine 7 to form.

Referring to FIG. 7, resilient element 8 is in a relaxed state and shows that it is comprised of a relatively long shaft portion 12 and bounded by end portions 13. Shaft portion 12 is designed to pass through holes in the tether while end portions 13 anchor the resilient element 8, preventing dislodgment.

Figure 8:
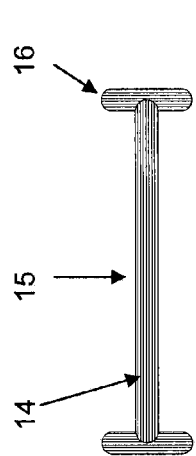
FIG. 8 is a plan view of a resilient element having two "T-shaped" end portions separated by a shaft portion.

Referring to FIG. 8, a close-up view of a resilient element 14 shows two "T-shaped" ends 16 and a shaft portion 15 which are inserted through holes of a receiving tether strap.

Figure 9:
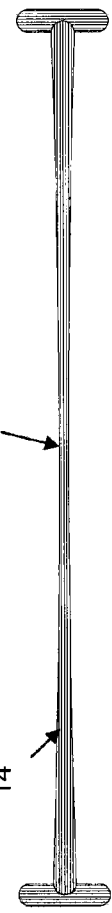
FIG. 9 is a plan view of the resilient element of FIG. 8 in an elongated state.

Referring to FIG. 9, the resilient element 14 of FIG. 8 is elongated such that shaft portion 15 is thinned in cross section.

Figure 10:
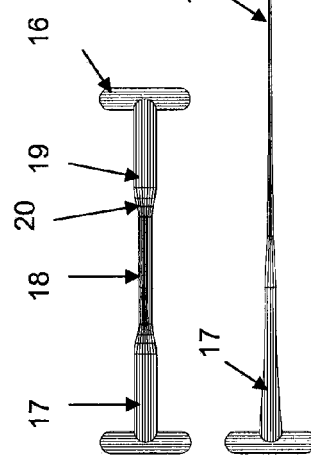
FIG. 10 is another embodiment of a resilient element having T-shaped ends and a variable cross section resilient element.

Referring to FIG. 10, an alternate embodiment is shown of a resilient element 17 in which T-shaped ends 16 are disposed at opposite ends of a variable cross section resilient element in which thin shaft portions 18 and thicker shaft portions 19 have different cross sections than each other so as to provide different load and elastic characteristics in response to applied elongating forces. A transition cross section 20 provides a smooth transition from one cross section to another, preventing stress concentration areas. Those skilled in the art will appreciate that the actual cross sectional shape, and in fact whether it is solid or hollow, is not the crucial feature that contributes to the performance and function of the resilient element, but rather that there are different cross sectional portions in the same resilient element. Those skilled in the art will also appreciate that the axial length of each cross sectional portion is not the crucial feature that contributes to the performance and function of the resilient element; rather, axial length of one cross sectional portion compared to another can be established to achieve a specifically tuned resistance-elongation ratio performance value for a specific application. Overall, the smaller the cross sectional shape, the lighter duty the load response capabilities will be for that portion of the resilient element. In contrast, progressively heavier cross sectional portions provide increasingly and correspondingly heavier duty load response capabilities. Light duty portions of the resilient element respond to elongation forces with less resistance than the larger cross sectional portions. Therefore, if a scenario occurs in which relatively light duty resistance is required, the resilient element is able to respond accordingly. In addition, if a scenario occurs in which relatively heavy duty resistance is required, the resilient element is also able to respond appropriately to the force application.

Figure 11:
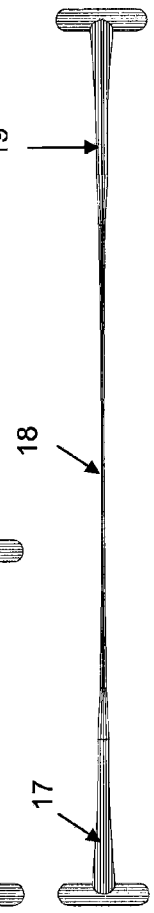
FIG. 11 is a top plan view of the resilient element of FIG. 10 in an elongated state.

Referring to FIG. 11, resilient element 17 of FIG. 10 is elongated such that shaft portions 18 and 19 are thinned respectively in cross section.

Figure 12:
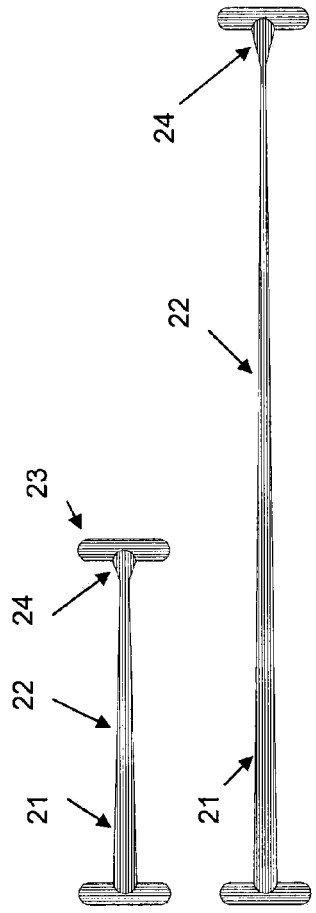
FIG. 12 is a top plan view of another embodiment resilient element having T-shaped ends disposed at opposite ends of a variable cross section resilient element further including a continuously variable and/or tapered cross section from one end to the other.

Referring to FIG. 12, another alternate embodiment is shown of the resilient element 21 in which T-shaped ends 23 are disposed at opposite ends of a variable cross section resilient element portion 22 and features a continuously variable and/or tapered cross section from one end to the other so as to provide a specific load and elastic characteristic in response to applied elongating forces. Transition cross section 24 provides a smooth transition from variable cross section to end 23, preventing stress concentration areas.

Figure 13:
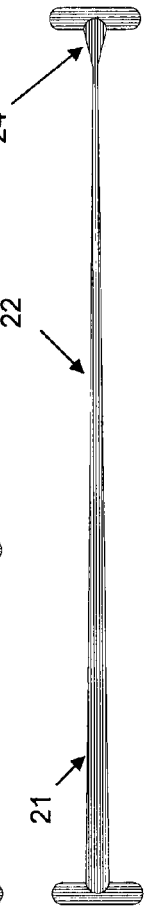
FIG. 13 is a top plan view of the resilient element of FIG. 12 in an elongated state.

Referring to FIG. 13, the resilient element of FIG. 12 is elongated such that variable cross section resilient element portion 22 is variably thinned in cross section. The thinner portions of variable cross section resilient element portion 22 will respond easily to light duty force-displacement with longer displacement elongation, while thicker shaft portions of variable cross section resilient element portion 22 will respond to heavier force loads with shorter displacement elongation.

Referring to FIG. 14, an alternate resilient embodiment 25 employs an elastic cord 27 shown with termination knots 26. Cord 27 is shown with a solid cross section 28. Those skilled in the art will appreciate that the actual cross sectional size and/or shape is not the primary feature contributing to the performance and function of the resilient element. One assembly method using cord 27 would be to establish termination knot 26 and then thread the other end through the holes of a tether product, forming a serpentine as shown in previous figures. Once the serpentine is formed, the second termination knot 26 can be established. The termination knots 26 are respectively larger than the holes in the tether and are therefore prevented from passing back through the hole in response to elongation forces acting on the tether.

Referring to FIG. 15, an alternate resilient embodiment 29 employs an elastic tube 31 shown with termination knot 33 on one end and an alternate termination method comprised of folding elastic tube 31 back on itself and securing it in hole of termination disk 30. Tube 31 is shown with a hollow tube cross section 32. Those skilled in the art will appreciate that the actual cross sectional size and/or shape is not the primary feature contributing to the performance and function of the resilient element. One assembly method using tube 31 would be to establish termination knot 33 or an alternate termination means and then thread the other end through the holes of the a tether product, forming a serpentine as shown in previous figures. Once a serpentine is formed, a termination knot 33 or other termination means can be established. Those skilled in the art will appreciate that the particular termination means is not the primary feature contributing to the performance and function of the resilient element; rather, some kind of termination means is required that presents a feature and/or structure which is larger than the holes in the tether product and therefore prevents the resilient element termination ends from passing back through the hole in response to elongation forces.

Referring to FIG. 16, another embodiment of the subject invention is shown in which a leash 34 application includes a hand grip 35 which is disposed between a wrist loop 38 and serpentine 36 containing resilient element 37, which arrangement maintains the relative position of the hand grip 35 from excessive axial translation relative to the leash during applied elongation force. An advantage to this embodiment is that the hand grip 35 is maintained in place without the need for any additional assembly components, minimizing assembly costs.

Referring to FIG. 17, a profile view is shown of the leash 34 in FIG. 16 with the serpentine 36 and resilient element 37 in an extended position.

Referring to FIG. 18, a leash embodiment 39 is shown in which a hand grip 41 is disposed between wrist loop 40 and tube extension 44 with serpentine 42 housed inside tube extension 44. Leash 45 extends out of the end of tube extension 44 such that when serpentine 42 is relaxed at rest, the end of leash 45 is not completely up inside the end of the tube extension 44. Those skilled in the art will appreciate that how the tube extension 44 is attached to the hand grip 41 and/or whether the tube extension 44 is clear, translucent, solid, or a material that changes phases between clear and opaque, is not a primary contributor to the functional features of the subject invention.

Referring to FIG. 19, a leash embodiment 46 from FIG. 18 is shown except with an integral light 48 included with a control switch 47 housed inside tube extension 44. Leash 45 extends out of the end of tube extension 44 such that when serpentine 42 and resilient element 43 are relaxed at rest, the end of leash 45 is not completely up inside the end of the tube extension 44. Those skilled in the art will appreciate that how the tube 44 is attached to the hand grip 41 and/or whether the tube extension 44 is clear, translucent, or a material that changes phases between clear and translucent, is not a primary contributor to the functional features of the subject invention. Those skilled in the art will also appreciate that the type of bulb in the light and/or the form of power for the light is not the primary contributor for the subject invention. A light 48 will shine and illuminate tube extension 44, acting as a visual indicator and awareness of the person and/or the animal. The light will further shine out the end of the tube acting as a small spotlight and/or flashlight to illuminate the path in front of the person to provide a measure of safety.

Referring to FIG. 20, the leash embodiment of FIG. 18 is shown demonstrating lateral flexibility of the tube 44 able to flex laterally in a rotational 360 degree sweep in response to elongation forces applied transverse to the tube's axis. For clarity and simplicity, positions 48 and 49 represent two positions at which the tube 44 is able to flex as it responds to lateral and/or transverse forces.

Referring to FIG. 21, a leash 49 embodiment is shown in which a hand grip 50 is disposed between wrist loop 51 and a retractable tether mechanism 52 with tube 57. Leash 58 extends out of the end of tube 57 such that the end of leash 58 is not completely up inside the end of the tube 57. Those skilled in the art will appreciate that how the tube 57 is attached to the retractable mechanism housing 52 and how housing 52 is attached to hand grip 50 and/or whether the tube 57 is clear, translucent, solid, or a material that changes phases between clear and opaque, is not a primary contributor to the functional features of the subject invention. Mechanical housing 52 includes buttons 53, 54, and 55 for the purposes of retracting the leash, establishing a brake for the leash, and controlling a light 56. The subject invention provides a resilient element and assembly housed inside the hand grip 50.

Referring to FIG. 22, an embodiment of a leash product is shown comprised of a wrist loop 51, a telescopic hand grip assembly comprised of outer housing 60 and inner sleeve 59, a retractable mechanism 52, and a leash 58. Retractable housing 52 includes at least one control button 53 and is attached to the hand grip assembly. Outer housing 60 is attached to retractable housing 52 and an inner sleeve 59 is attached to wrist loop 51. Inner sleeve 59 is closed off adjacent to the wrist loop 51 except for an opening for the wrist loop to pass through. Retaining devices 63 straddle both sides of the closed end of inner sleeve 59 and prevent wrist loop 51 from excessive axial translation relative to the hand grip assembly. Serpentine 61 and resilient element 62 provide an elongation means for strap 67 housed inside of inner sleeve 59. Strap 67 is attached to retractable housing 52.

Referring to FIG. 23, an embodiment of a leash product is shown comprised of a wrist loop 51, a telescopic hand grip assembly 62, a retractable mechanism 52, and a leash strap 49. Leash 49 includes hand grip 50. Retractable housing 51 includes at least one control button 53 and is attached to hand grip assembly 55. Hand grip assembly is comprised of an outer sleeve 64 which is attached to wrist loop 51 and an inner sleeve 65 which is attached to retractable housing 52. Outer sleeve 64 is closed off at one end adjacent to the wrist loop 51 except for an opening for the wrist loop to pass through. The closed end of housing 64 and serpentine 61 prevent wrist loop 51 from excessive axial translation relative to the hand grip assembly. Serpentine 61 and resilient element 62 provide an elongation means for strap 67 housed inside of inner sleeve 65. Strap 67 is attached to retractable housing 52.

Referring to FIG. 24, the leash embodiment from FIG. 23 is modified to include a tube 57. The flexible leash 58 includes strap restrictor device 65. Restrictor 65 can be a washer, knot, or some kind of device that is larger than the hole in the tube 57 and therefore prevents retraction housing 52 from being able to retract leash 58 and clasp 68 into the tube. Some combinations of clasp 68 compared to the hole in tube 57 may be sufficient in and of themselves to allow clasp 68 to function as both a clasp and a restrictor device.

Referring to FIG. 25, a tether portion 69 is assembled with a tubular formed resilient element 71 to form serpentine 70. The ends of resilient element 71 are terminated and restrained using a wrap device 72 such as a wire tie or other typical wrapping method.

Referring to FIG. 26, tether portion 69 is assembled with resilient element 71 to form serpentine 70. Resilient element 71 is shown to be a hollow tube with an opening 73 at each end. The end of tubular resilient element 71 can be expanded to receive insert 76 which creates a bulge that can snug into the flared opening of tunnel 74 but is too large to pass through the secured portion of tunnel 74. Tunnel 74 is attached to tether 69 such that it effectively restrains the terminated ends of tubular resilient element 71. The middle portion of tunnel 74 is fixed to tether 69, while the openings to the tunnel are flared to prevent stress concentration areas on tubular resilient element 71 during repeated elongation cycles.

Referring to FIG. 27, tether portion 69 is assembled with resilient element 71 to form serpentine 70. Resilient element 71 is shown to be a hollow tube with an opening 73 at each end. The end of tubular resilient element 71 can be expanded to receive insert 76 which creates a bulge that can be received by the large opening of truncated funnel 77 but is too large to pass through the small opening of truncated funnel 77. Truncated funnel 77 is attached to tether 69 such that it effectively restrains the terminated ends of tubular resilient element 71.

Referring to FIG. 28, tether portion 69 is assembled with resilient element 71 to form serpentine 70. Resilient element 71 is shown to be a hollow tube with an opening 73 at each end. The end of tubular resilient element 71 can be expanded to receive insert 76 which creates a bulge that is too large to pass through the opening of tunnel 78. Tunnel 78 is attached to tether 69 such that it effectively restrains the terminated ends of tubular resilient element 71. In this embodiment the entire length of tunnel 78 is fixed to tether 69.

Referring to FIG. 29, an embodiment of the subject invention is applied to a towing strap 80 for the typical purpose of connecting between two vehicles whereby one vehicle pulls another vehicle via the towing strap 80 disposed between the two vehicles. One problem with prior towing straps is that towing motion does not occur until the moment that the towing strap becomes stretched tight between the two vehicles, at which point a hard taut jerk is experienced which can cause damage to the vehicles, injury to the drivers, and/or lost confidence that the vehicles are under control. The subject invention addresses this problem and overcomes it by providing a resilient element incorporated into the towing strap. Hooks 79 are connected to each vehicle. Serpentine 81 contains at least one resilient element 82 and may include multiple resilient elements 82 to match towing ratings of a specific towing strap.

Referring to FIG. 30, the towing strap from FIG. 29 is shown in elongated position.

Referring to FIG. 31, an embodiment of the subject invention is applied to a towing strap link for the typical purpose of connecting between two vehicles whereby one vehicle pulls another vehicle using a typical prior towing strap or towing chain disposed between the two vehicles. One problem with prior towing straps and towing chains is that towing motion does not occur until the moment that the towing strap becomes stretched tight between the two vehicles, at which point a hard taut jerk is experienced which can cause damage to the vehicles, injury to the drivers, and/or lost confidence that the vehicles are under control. The subject invention addresses this problem and overcomes it by providing a resilient element incorporated into the towing strap link 84 which can be used in conjunction with prior towing straps and chains to essentially upgrade them with improved features of the subject invention. In use, a prior towing strap or chain is connected to one vehicle and the other end of the prior towing strap or chain is connected to the subject invention at one hook 83. The other hook 83 is connected to the other vehicle. Serpentine 85 contains at least one resilient element 86 and may include multiple resilient elements 86 to match towing ratings of a specific towing strap.

Referring to FIG. 32, the towing strap link 84 from FIG. 31 is shown in an elongated position.

Referring to FIG. 33, a relatively heavy duty resilient element 87 is shown.

Referring to FIG. 34, a relatively light duty resilient element 88 is shown.

Referring to FIG. 35, an embodiment of the subject invention is applied to a leash 91 in which the leash includes a relatively light duty resilient element 88 with corresponding serpentine 90 and also a relatively heavy duty resilient element 87 with corresponding serpentine 89.

Referring to FIG. 36, a profile view of an alternative leash embodiment 92 of the subject invention utilizes resilient elements 93, 94, and 95 in shapes similar to O-rings. The O-rings may be all of the same relative size or as shown in FIG. 36 in which they are of different sizes and/or load responses. In this view, displacement limiter 96 is not shown for clarity.

Referring to FIG. 37, a plan view is shown of the leash 92 from FIG. 36 which in this view displacement limiter 96 can be seen for the purposes of limiting the displacement of the resilient elements so that they cannot reach their tensile break point before the displacement limiter 96 reaches a relative taut position.

Referring to FIG. 38, leash 92 from FIG. 37 is shown in an elongated position.

Referring to FIG. 39, an embodiment of the subject invention is applied to a towing hitch assembly 97, similar to a Reese brand hitch system. A typical hitch system 97 of the preferred embodiment may include a locking pin 98 and spring pin 99 to retain sleeve 107. Sleeve 107 houses inside telescopic sleeve 106, resilient element 103, and serpentine 102. One end of serpentine strap 102 is connected to pin assembly 100-101 by strap joint 104 and the other end is connected to hitch loop 108 by strap joint components 105.

Referring to FIG. 40, an embodiment of a leash application includes a hand grip 110 disposed between wrist loop 109 and retraction housing 113. Control buttons 112 and 113 provide a tension control for the strap 116 and a strap locking feature. Serpentine 114 and resilient element 115 are located so that they provide shock absorption and also serve a strap retraction restrictor, which prevents the entire leash 116 from being retracted in the housing 113.

Referring to FIG. 41, a leash application 119 is shown with an enlargement view of resilient element 117 and serpentine assembly 118 used with a horse connected on one end and held on the other end by a person.

Referring to FIG. 42, a leash application 141 is shown with an enlargement view of resilient element 122 and serpentine 121 used with a large animal such as a large dog connected on one end at a typical prior collar 123 and held on the other end by a person.

Referring to FIG. 43, a child restraint tether application 124 is shown connected to a child wearing a typical harness of belt 127 and held by a person. An enlargement view of tether 124 shows serpentine 125 and resilient element assembly 126.

Referring to FIG. 44, a sport tether application 128 is used in skiing connected to a boat on one end and held by a person on the other end. An enlargement of a portion of 128 shows serpentine 129 and resilient element 130.

Referring to FIG. 45, a sport hunting safety restraint tether application 131 is connected to typical elevated tower 135 on one end and connected to a typical safety harness 132 worn by a person. Enlargement view of tether 131 shows resilient element 133 and serpentine 134. In the event that the person falls off the platform of tower 135, prior safety devices will prevent the person from falling all the way to the ground, which can cause serious injury and/or death. However, one problem with prior systems is that, at the very moment that the person's weight extends the safety tether to maximum, there is a hard taut jerk and stop, which is less injurious than the full fall to the ground, but nonetheless injurious in and of itself. The subject invention addresses and overcomes this problem by providing an appropriate shock absorber system in the resilient element 133 and serpentine 134.

Referring to FIG. 46, a leash application is shown wherein leash 136 includes an enlargement view showing resilient element 138 and serpentine 137 attached to a traditional prior choke collar 139. The application of the subject invention in combination with the prior choke collar essentially upgrades the prior choke collar to a more humane device than it can be by itself without the subject invention.

Referring to FIG. 47, a standard prior leash 140 and a standard prior choke collar 139 are shown wherein a preferred embodiment link application of the subject invention leash 141 includes an enlargement view showing resilient element 143 and serpentine 142. Leash 141 connects to the choke collar on one end with clasp 144 and is attached to the leash via ring 145. The application of the subject invention in combination with the prior choke collar and the standard leash essentially upgrades the prior choke collar and leash to more humane and effective devices than they can be by themselves without the subject invention.

Referring to FIG. 48, a leash of the subject invention 146 includes a resilient element and a serpentine housed within a flexible sleeve 147. The flexible sleeve 147 can be a fabric or collapsible material or other stretchy material providing suitable expansion and at the same time protection from incidental damage as the resilient element extends to follow the displacement of the resilient element during use.

Referring to FIG. 49, the leash from FIG. 48 is shown in an elongated position.

Referring to FIG. 50, an embodiment of the subject invention 148 is applied to a standard prior halter 152 such as is used for a horse or other large animal wherein the serpentine 149 and resilient element 150 are shown in an enlarged view and are either a permanent attachment to the halter 152 and/or the resilient element 148 is embedded in the strap construction of the halter. Any rope or leash or tether device 151 can be attached to the improved halter system which essentially upgrades the rope or tether with the advantages of the subject invention. A useful feature of the subject invention is that, if the resilient element 148 is embedded in the tether device 151 construction, then the resilient element 148 will not be dangling from the halter 152. In similar fashion, another feature of the subject invention applies if the serpentine 149 and resilient element 150 are a link style attachment to the halter 152, wherein the dangling end can be simply attached to another part of the halter 152 to eliminate the dangling portion when not in use with a leash or tether device 151.

Referring to FIG. 51, an alternate embodiment of the subject invention is shown wherein resilient element 156 is weaved through the holes formed by the links of chain 154 and retained in place by T-shaped ends 155. In this particular application, the chain 154 is part of the construction of a typical standard dog choke collar. Those skilled in the art will appreciate that this concept is not limited to the type of chain, size of chain, shape of links, material of the links, or even the particular application of the chain, whether it be a leash for an animal, a vehicle tow chain, a safety harness chain, et cetera.

Referring to FIG. 52A, a preferred embodiment 157 of the subject invention is shown wherein more than one resilient element assembly is positioned under protective covers 158 and 159. This embodiment includes a sliding hand grip 163 with sliding adjustment limited by assembly 158 and stop tabs 162. A first wrist loop 161 is provided at one end of the leash and a second wrist loop 160 is provided near the other end of the leash to provide close control of the animal. Elastic strap 164 is provided to bundle the entire product for storage. Those skilled in the art will appreciate that the actual length of strap or tether is not a critical feature of the product, nor whether the tether includes a length adjustment means to accommodate various leash lengths. Those skilled in the art will also appreciate that various protective cover methods readily exist for bundling and storing the product when not in use.

Referring to FIG. 52B, an example is shown of a preferred embodiment of a dog pull toy 165 comprised of a hand grip 166 and resilient assembly in a cover 167 and a chew ring 170 retained by a strap 168. An alternate chew toy 171 is replaceable in retaining strap 168. The pull toy also features an optional pocket 169 wherein an item such as an olfactory treat or an audible training item can be deposited to entice the pet to play and/or train with the pull toy and then removed at the discretion of the user as a reward. Chew toy 171 is also shown with an optional pocket 172 for receiving an audible and/or olfactory item. Professional dog trainers can use pockets like 169 to train dogs for certain smells for search and rescue and other specialized training. By combining the treat delivery pocket 169 with a force-displacement device in cover 167 this preferred embodiment of the subject invention provides training and recreation benefits not possible with prior training devices or prior pull toys.

Referring to FIG. 53, an embodiment of the subject invention is shown that presents a variation on the theme wherein the resilient element 175 does not pass through holes in tether 173. Resilient element 175 is attached to tether 173 at both ends, such as 177. In a relaxed position, resilient element 175 causes tether 173 to bundle up, represented by serpentine portion 174. Bundled serpentine portion 174 provides a displacement limiter preventing resilient element 175 from elongating past the tensile break point of the resilient material. The geometry of resilient element 175 includes radii 176 that easily straighten out to provide relatively long displacement length at relatively low force loads, and then transition into relatively short displacement length at relatively high force loads as resilient element 175 begins to actually stretch and elongate.

Referring to FIG. 54, the embodiment of FIG. 53 is shown in an elongated position.

Referring to FIG. 55, an embodiment of the subject invention is shown wherein gun 178 has shoulder strap 181 with a portion of the strap assembled with a resilient element 180 and a serpentine 179.

Referring to FIG. 56, an embodiment of the subject invention is shown wherein a dog harness 186 has an integral assembly 187 containing serpentine 183, resilient element 184, and attachment ring 185. A tether device 182 attaches at ring 185.

Referring to FIG. 57, an embodiment of the subject invention is shown wherein a martingale style collar 189 has been improved with resilient elements and serpentines 191 in a short strap portion 193 which is free to slide through rings 190. A tether device 188 attaches at ring 192.

Referring to FIG. 58, Chart 1 depicts known resilient devices and springs all having a characteristic force-displacement relationship that is basically linear in nature, meaning that for any given change in force there is a corresponding displacement response which, when graphed, represents a relatively linear line slope. Chart 1 shows one such linear relationship typical of resilient and spring type elements. The slope of the linear relationship may be different than the one shown in Chart 1, depending upon the physical properties of the resilient element, but it will still be relatively linear.

Referring to FIG. 59, the subject invention provides a resilient device in which there is a more complex relationship between force and displacement that is not a typical linear relationship. Chart 2 shows one such complex force-displacement relationship wherein there is an initial light duty load response that transitions into a medium duty load response and that finally transitions into a heavy duty load response. The initial light duty load results in a force-displacement wherein relatively low force is required to displace a relatively long displacement distance. The final heavy duty load results in a relatively high force required to displace a relatively short displacement distance. A transition exists between them providing a relatively median force required displacing a relatively median displacement distance.

This complex force-displacement relationship is accomplished by combining the physical properties of a resilient element to cooperate with geometric shapes so as to augment an assembled structure into a deliberately and specifically complex force-displacement relationship to accomplish improved functions and/or performance not possible with an assembly structure utilizing a simple linear force-displacement relationship. The subject invention combines the geometric shape of various tethering devices with the physical properties of a resilient element to accomplish this complex force-displacement relationship. Several variations on the theme and numerous applications and/or uses of the subject invention are described in detail in the preceding figures, from which the features and benefits of the subject invention will become self apparent.

In each case of the preferred embodiments wherein a tethering device is assembled such that a portion of the tether is formed into a serpentine with the resilient element passing through a series of holes in the tether, the serpentine is free to initially straighten out as the resilient element is elongated in response to force-displacement action. The resulting force-displacement that occurs is relatively light duty force combined with relatively long displacement, as shown in Chart 2. If displacement continues, at some point the tether will reach a full taut straight position. However, before the tether has achieved full straight position, the geometric shape of the serpentines in the tether will impinge upon the resilient element increasing the force required to continue displacement, resulting in relatively heavy duty force required to displace a relatively short distance. As Chart 2 shows, there is a transition zone between the light duty force-displacement and the heavy duty force-displacement zones. This transition zone is where the geometry of the serpentines begins to impinge upon the resilient element and when the serpentines are fully engaged in contact with the resilient element.

Those skilled in the art will readily appreciate that this transition zone can be adjusted and/or designed for specific applications by changing the relative fit of the holes in the tether and the size of the resilient element passing through the holes. In addition, those skilled in the art will appreciate that the number of serpentines and the relative magnitude of the sine wave pattern of the serpentine also has a profound impact upon the performance of the assembly. In other words, a looser sine wave serpentine pattern will allow for increased length of displacement during the light duty force-displacement while, by comparison, a tighter sine wave serpentine pattern will limit the length of the light duty force-displacement. Thusly, each zone of the complex force-displacement response of the assembly of the subject invention can be tuned and/or designed to meet specific application requirements.

While most of the preferred embodiments shown in the figures display just two zones of force-displacement with one transition zone between them, those skilled in the art will appreciate that the subject invention can be designed to have three or more zones of force-displacement, each with a corresponding transition zone between each one. FIG. 10 and FIG. 12 represent examples of the preferred embodiment wherein multiple zones of force-deflection are designed into the resilient element itself, while FIG. 35 and FIG. 37 represent an example of the preferred embodiment wherein at least two different strength resilient elements and corresponding serpentine assemblies are resident in the product to provide different zones of force-deflection performance.

Many of the embodiments of the subject invention shown combine the geometry of a serpentine portion of the tether with the physical properties of the resilient element to create the complex force-displacement response with multiple zones of response. A variation of this application of the subject invention is shown in FIG. 51 wherein the physical properties of the resilient element are combined with the geometry of the collapsing links of chain, wherein the holes in the links of the chain impinge upon the resilient element as the chain portion is straightened out to full length.

Yet another variation on the theme of the subject invention is shown in FIG. 37 and FIG. 53 wherein the combination of specific geometry of the resilient element combined with the physical properties of the same resilient element serve to establish the complex multi-zone force-displacement response. Both of these embodiments use the geometry of the radii of the resilient element to provide light duty displacement as the resilient element straightens out in response to displacement force and then transitions into heavy duty displacement as the resilient element actually begins to stretch.

It will be readily apparent to those skilled in the art that the embodiments and applications shown in this disclosure are not intended to be exhaustive, but rather represent only a portion of potential applications that can benefit from the advantages of the subject invention.

The foregoing description of the embodiments has been provided for purposes of illustration and description. It is not intended to be exhaustive or to limit the disclosure. Individual elements or features of a particular embodiment are generally not limited to that particular embodiment but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tether device, comprising:
    a tether assembly disposed between two entities to maintain connection between the two entities;
    a resilient element integrated with the tether assembly, a shape of the resilient element defining a tube;
    the tether assembly defining a tether having openings created in the tether, the resilient element being assembled through the openings in the tether;
    an internal insert inserted inside the resilient element creating a bulge in the tube, the bulge sized to preclude its passage through the openings in the tether; and
    a geometry of the tether assembly and the resilient element creating at least first and second force-displacement responses of the resilient element and the tether assembly when the resilient element and the tether assembly are together subjected to at least first and second axial displacement forces, the second axial displacement force being greater than the first axial displacement force, the first force-displacement response when subjected to the first axial displacement force is greater than the second force-displacement response when subjected to the second axial displacement force.

2. The tether device of claim 1, further including a displacement limiter acting to limit an axial displacement of the resilient element.

3. The tether device of claim 2, wherein the displacement limiter becomes taut preventing further extension of the resilient element before the resilient element is elongated to a resilient element tensile break point.

4. The tether device of claim 1, wherein the tether is constructed of one of a flexible fabric, a fibrous material or a polymer.

5. The tether device of claim 1, wherein the tether is constructed of one of a flexible metal strap, a cable or a cord.

6. The tether device of claim 1, wherein the tether is constructed of from a chain link material.

7. The tether device of claim 1, wherein a shape of the openings is substantially round or oval.

8. The tether device of claim 1, wherein a geometry of the openings causes impingement between the tether and the resilient element when the tether is subjected to the first and second axial displacement forces.

9. The tether device of claim 1, wherein the resilient element is made of a rubber or a material possessing rubber elongation properties.

10. The tether device of claim 1, wherein the resilient element is made of a latex material.

11. The tether device of claim 1, further including first and second restraining devices wherein the resilient element is restrained at opposed ends by the restraining devices to anchor the opposed ends of the tube to the tether.

12. The tether device of claim 11, wherein the restraining devices each comprise a constrictive wrap component applied around both the resilient element and the tether to anchor an end of the resilient element to the tether.

13. The tether device of claim 1, further including a tunnel shaped structure attached to the tether through which the resilient element is disposed, the tunnel shaped structure including an opening sized to prevent an end of the resilient element, the internal plug and the external washers from passing therethrough.

14. The tether device of claim 13, further including at least one opening of the tunnel shaped structure flared outward.

15. The tether device of claim 1, further including a funnel shaped structure attached to the tether through which the resilient element is disposed, the funnel shaped structure including an opening sized to prevent an end of the resilient element, the internal plug and the external washers from passing therethrough.

16. The tether device of claim 15, further including at least one opening of the funnel shaped structure flared outward.

17. The tether device of claim 1, wherein the tether is configured at least in part in a serpentine formation when the tether is in a relaxed position, the serpentine formation being straightened taut when the tether is fully extended by the second axial displacement force.

18. The tether device of claim 17, wherein a number and magnitude of sine wave serpentine shapes of the serpentine formation vary dependent upon values selected for the first and second axial displacement forces.

19. The tether device of claim 17, wherein the serpentine formation is straightened taut before the resilient element is elongated to a resilient element tensile break point.

20. The tether device of claim 1, wherein the resilient element is connected to the tether at least at one point.

21. The tether device of claim 20, wherein the first force-displacement response corresponds to a first displacement length, and as continued displacement of the resilient element occurs the geometry transitions into a straightened position having a second displacement length defining the second force-displacement response.

22. The resilient element of claim 20, wherein the resilient element geometry is serpentine in shape defining a sine wave shaped structure.

23. A tether device, comprising:
    a tether assembly disposed between two entities to maintain connection between the two entities;
    a resilient element integrated with the tether assembly, a shape of the resilient element defining a tube;
    the tether assembly defining a tether having openings created in the tether, the resilient element being assembled through the openings in the tether;
    an internal insert inserted inside the resilient element creating a bulge in the tube, the bulge sized to preclude its passage through the openings in the tether;
    a geometry of the tether assembly and the resilient element creating at least first and second force-displacement responses of the resilient element and the tether assembly when the resilient element and the tether assembly are together subjected to at least first and second axial displacement forces, the second axial displacement force being greater than the first axial displacement force, the first force-displacement response when subjected to the first axial displacement force is greater than the second force-displacement response when subjected to the second axial displacement force;
first and second restraining devices wherein the resilient element is restrained at opposed ends by the restraining devices to anchor the opposed ends of the tube to the tether;
wherein the restraining devices include external washers imposing an inward constriction upon the resilient element, the external washers sized to preclude their passage through the openings in the tether.

24. The tether device of claim 1, wherein a portion of the tether includes a displacement limiter to prevent the resilient element from elongating to a resilient element tensile break point.

25. The tether device of claim 1, wherein the resilient element comprises first, second and third O-ring elements.

26. The tether device of claim 25, wherein the first, second and third O-ring elements each have the same size and load response.

27. The tether device of claim 25, wherein the first, second and third O-ring elements each have a different size and a different load response.

28. A tether device, comprising:
a tether assembly having a tether disposed between at least two entities through which the tether maintains connection between the two entities;
at least one resilient element having a shape defining a tube integrated as part of the tether assembly, the resilient element possessing physical material properties that promote elongation of the resilient element, the resilient element being assembled through openings created in the tether;
an internal insert inserted inside the resilient element creating a bulge in the tube, the bulge sized to preclude its passage through the openings in the tether;
a geometry of the tether that cooperates with the physical material properties of the resilient element to establish different force-displacement responses when the tether is subjected to different axial displacement forces;
a displacement limiter connected to the tether preventing the resilient element from extending to a resilient element tensile break point; and
a hand grip positioned proximate to an end of the tether for gripping by one of the entities.

29. The tether device of claim 28, wherein the hand grip is adjustably translatable along the tether device for a defined length of translation adjustment.

30. The tether device of claim 29, wherein the defined length of translation adjustment of the hand grip is limited by at least one stop member integrated to the tether, the stop member including one of a tab structure or a resilient element assembly.

31. The tether device of claim 28, wherein the geometry of the tether assembly and the resilient element create at least first and second force-displacement responses of the resilient element and the tether assembly when the resilient element and the tether assembly are together subjected to at least first and second axial displacement forces, the second axial displacement force being greater than the first axial displacement force, the first force-displacement response when subjected to the first axial displacement force is greater than the second force-displacement response when subjected to the second axial displacement force.

32. The tether device of claim 31, wherein the geometry of the tether assembly defines at least in part in a serpentine formation when the tether is in a relaxed position, the resilient element extending through the openings created in the tether in the serpentine formation, the serpentine formation being straightened taut when the tether is fully extended by the second axial displacement force.

33. A tether device, comprising:
a tether assembly having a tether disposed between at least two entities through which the tether maintains connection between the two entities;
at least one resilient element having a shape defining a tube integrated as part of the tether assembly, the resilient element being assembled through openings created in the tether, the resilient element possessing physical material properties that promote elongation of the resilient element;
an internal insert inserted inside the resilient element creating a bulge in the tube, the bulge sized to preclude its passage through the openings in the tether;
a geometry of the tether that cooperates with the physical material properties of the resilient element to establish force-displacement responses when the tether is subjected to axial displacement forces;
a displacement limiter connected to the tether preventing the resilient element from extending to a resilient element tensile break point;
a wrist loop defining an end of the tether; and
a hand grip partially covering the tether proximate to the wrist loop for manual gripping by one of the entities.

34. The tether device of claim 33, wherein a tube extends beyond the hand grip.

35. The tether device of claim 34, wherein the tube is flexible and resilient allowing lateral deflection.

36. The tether device of claim 34, wherein the resilient element is housed inside the tube.

37. The tether device of claim 34, wherein a light is housed within the tube providing illumination through the tube, the tube having walls being either opaque, translucent, or clear.

38. The tether device of claim 33, wherein the geometry of the tether assembly and the resilient element create at least first and second force-displacement responses of the resilient element and the tether assembly when the resilient element and the tether assembly are together subjected to at least first and second axial displacement forces, the second axial displacement force being greater than the first axial displacement force, the first force-displacement response when subjected to the first axial displacement force is greater than the second force-displacement response when subjected to the second axial displacement force.

39. The tether device of claim 38, wherein the geometry of the tether assembly defines at least in part in a serpentine formation when the tether is in a relaxed position, the resilient element extending through openings created in the tether in the serpentine formation, the serpentine formation being straightened taut when the tether is fully extended by the second axial displacement force.

40. The tether device of claim 33, wherein an overall length of the tether device ranges from approximately 5 feet to approximately 8 feet providing freedom of movement for an animal connected to the tether.

41. The tether device of claim 40, wherein the overall length of the tether device is adjustable between 5 feet and 8 feet.

42. The tether device of claim 33, wherein an overall length of the tether device ranges from approximately 1 foot to approximately 3 feet providing freedom of movement for an animal connected to the tether.

43. A force-displacement tether device, comprising:
a tether assembly including a tether disposed between two entities to maintain connection between the two entities, the tether configured at least in part in a serpentine formation when the tether is in a relaxed position;
an axially extendable resilient element integrated with the tether assembly having the resilient element disposed through openings created in the tether in the serpentine formation, a shape of the resilient element defining a tube;
an internal insert inserted inside the resilient element creating a bulge in the tube, the bulge sized to preclude its passage through the openings in the tether; and
the serpentine formation of the tether assembly and the resilient element permitting at least first and second force-displacement responses of the resilient element and the tether assembly when the resilient element and the tether assembly are together subjected to at least first and second axial displacement forces, the second axial displacement force being greater than the first axial displacement force, the first force-displacement response when subjected to the first axial displacement force is greater than the second force-displacement response when subjected to the second axial displacement force.

44. The tether device of claim 43, wherein the serpentine formation is straightened to a taut position when the tether is fully extended by the second axial displacement force.

45. The tether device of claim 43, wherein a third force-displacement response is created when a third axial displacement force greater than the first axial displacement force but less than the second axial displacement force is applied, the third force-displacement response being less than the first force-displacement response and greater than the second force-displacement response.

* * * * *